United States Patent
Maruyama et al.

(10) Patent No.: US 11,013,984 B2
(45) Date of Patent: May 25, 2021

(54) GAME SYSTEM, GAME PROCESSING METHOD, STORAGE MEDIUM HAVING STORED THEREIN GAME PROGRAM, GAME APPARATUS, AND GAME CONTROLLER

(71) Applicants: NINTENDO CO., LTD., Kyoto (JP); THE POKÉMON COMPANY, Tokyo (JP)

(72) Inventors: Kazuhiro Maruyama, Kyoto (JP); Hiroyuki Takeuchi, Kyoto (JP); Hiroki Soji, Kyoto (JP); Kohei Odanaka, Kyoto (JP); Masaya Takei, Kyoto (JP); Tsunekazu Ishihara, Tokyo (JP); Satoshi Ogawa, Tokyo (JP)

(73) Assignees: NINTENDO CO., LTD., Kyoto (JP); THE POKÉMON COMPANY, Tokyo (JP)

( * ) Notice: Subject to any disclaimer, the term of this patent is extended or adjusted under 35 U.S.C. 154(b) by 87 days.

(21) Appl. No.: 16/587,687

(22) Filed: Sep. 30, 2019

(65) Prior Publication Data
US 2020/0114253 A1 Apr. 16, 2020

(30) Foreign Application Priority Data
Oct. 11, 2018 (JP) .............................. JP2018-192743

(51) Int. Cl.
*A63F 9/24* (2006.01)
*A63F 9/00* (2006.01)
*G06F 11/00* (2006.01)
*G06F 13/00* (2006.01)
*A63F 13/211* (2014.01)
*A63F 13/23* (2014.01)
*A63F 13/54* (2014.01)
*A63F 13/537* (2014.01)
*A63F 13/285* (2014.01)
*A63F 13/2145* (2014.01)
*A63F 13/327* (2014.01)
*A63F 13/24* (2014.01)

(52) U.S. Cl.
CPC ............ *A63F 13/211* (2014.09); *A63F 13/23* (2014.09); *A63F 13/285* (2014.09); *A63F 13/537* (2014.09); *A63F 13/54* (2014.09); *A63F 13/2145* (2014.09); *A63F 13/24* (2014.09); *A63F 13/327* (2014.09); *A63F 2300/105* (2013.01); *A63F 2300/1025* (2013.01); *A63F 2300/302* (2013.01); *A63F 2300/6045* (2013.01)

(58) Field of Classification Search
USPC ........................ 463/5, 20, 22, 25, 33, 39, 40
See application file for complete search history.

(56) References Cited

U.S. PATENT DOCUMENTS

2010/0256949 A1 10/2010 Ohmori et al.

FOREIGN PATENT DOCUMENTS

JP 2010-240070 10/2010

*Primary Examiner* — Adetokunbo O Torimiro
(74) *Attorney, Agent, or Firm* — Nixon & Vanderhye PC

(57) ABSTRACT

Based on first data transmitted from a game controller, a game apparatus executes game processing for catching a predetermined game character and transmits, to the game controller, second data corresponding to the game character as a target to be caught. Based on the transmitted second data, the game controller outputs a sound corresponding to the caught game character.

17 Claims, 20 Drawing Sheets

F I G. 8
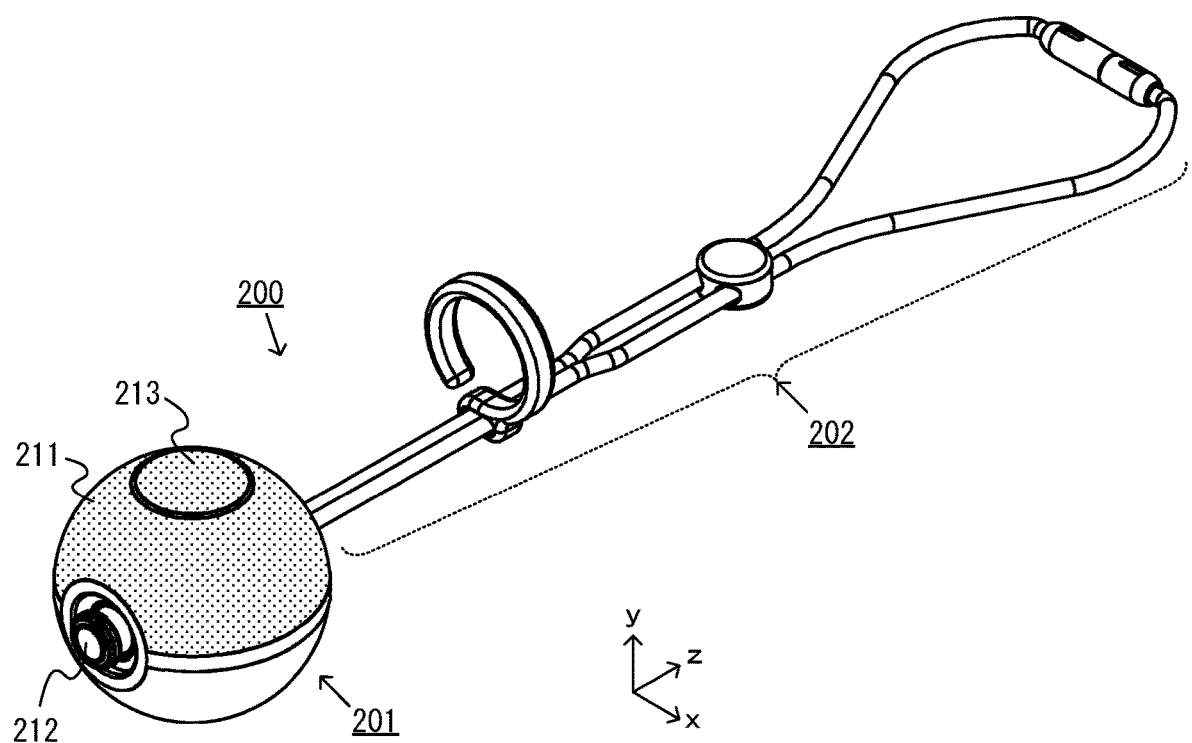

F I G. 1 2
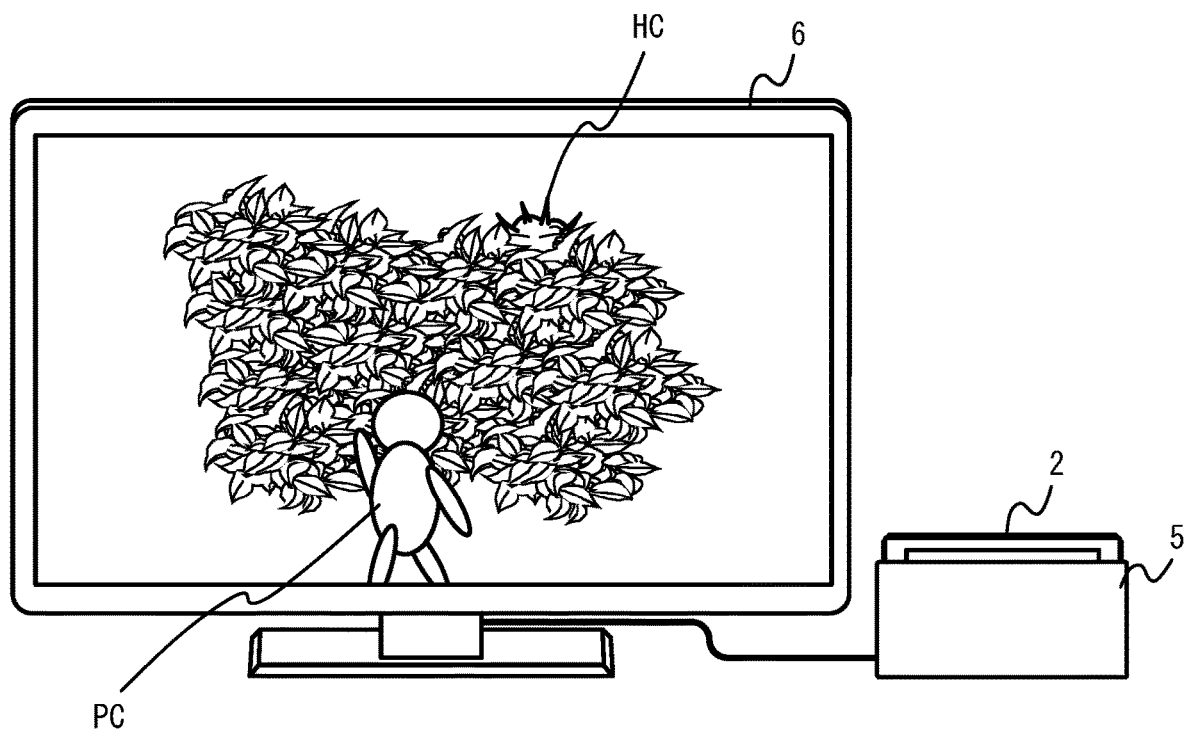
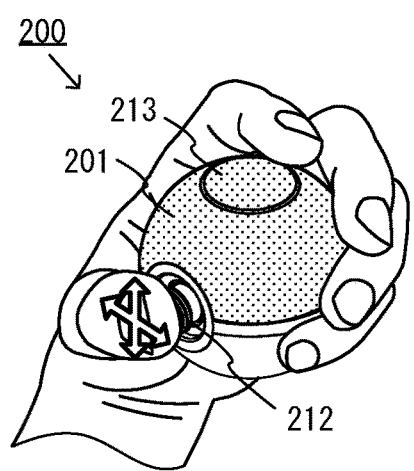

F I G. 1 3
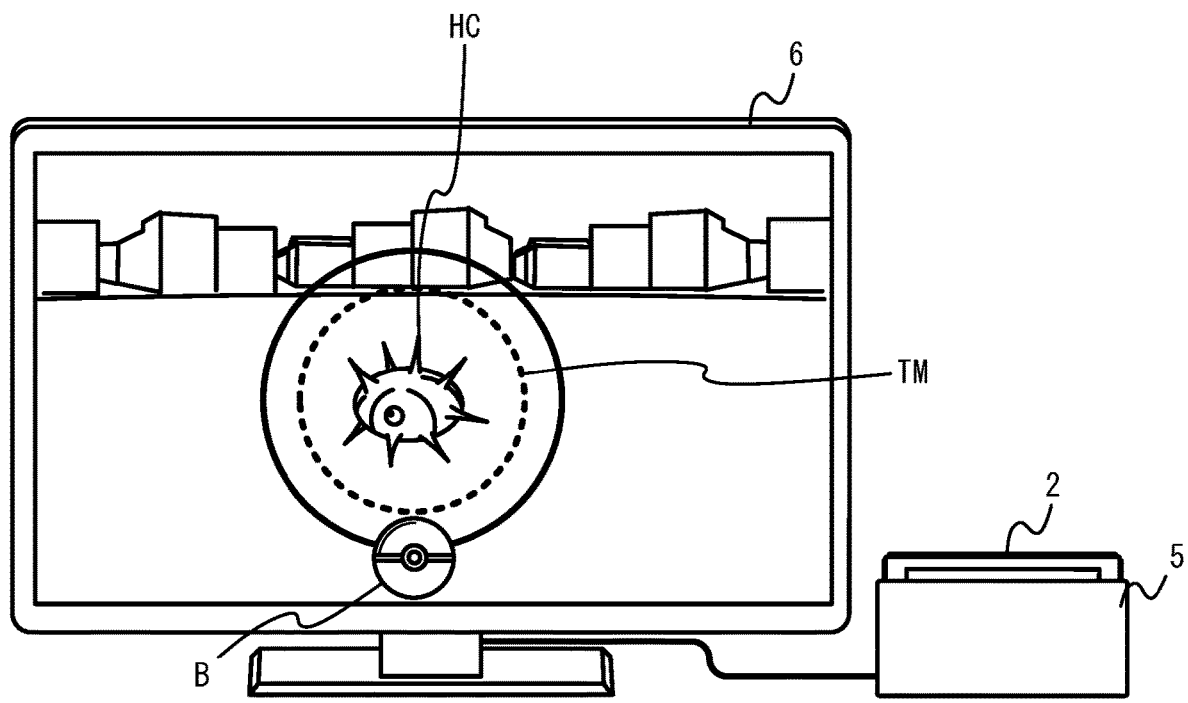
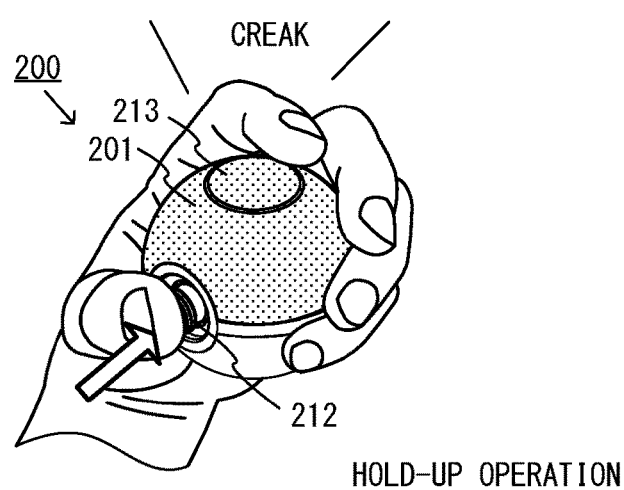
HOLD-UP OPERATION

FIG. 14
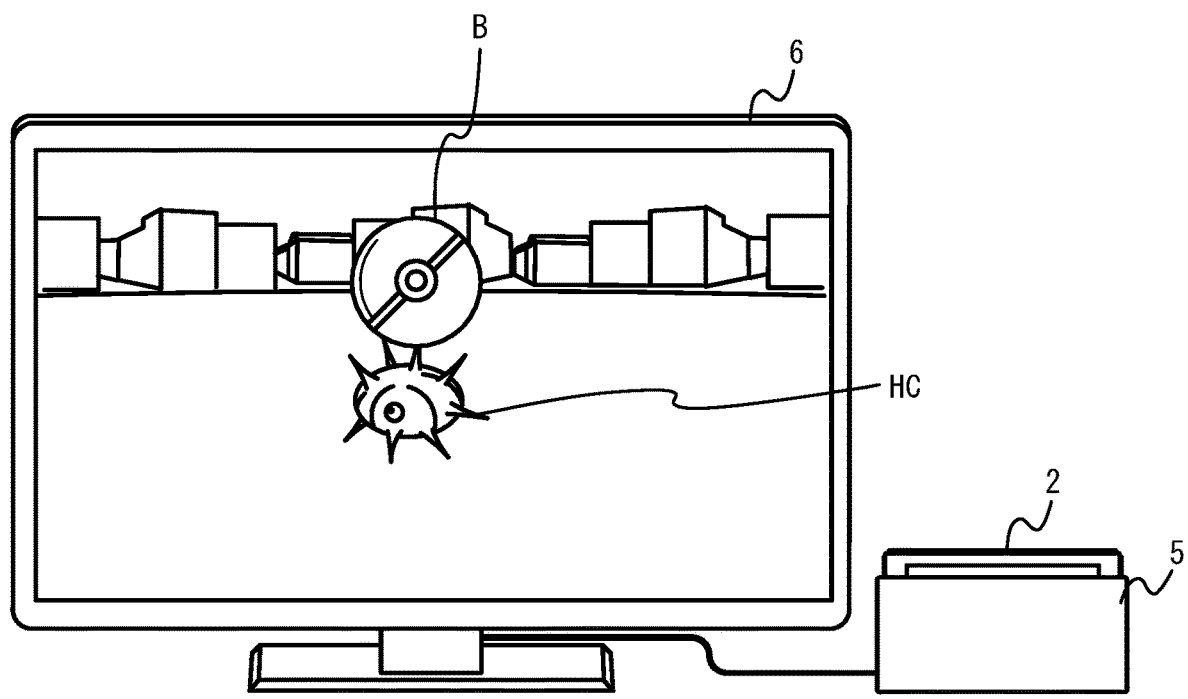
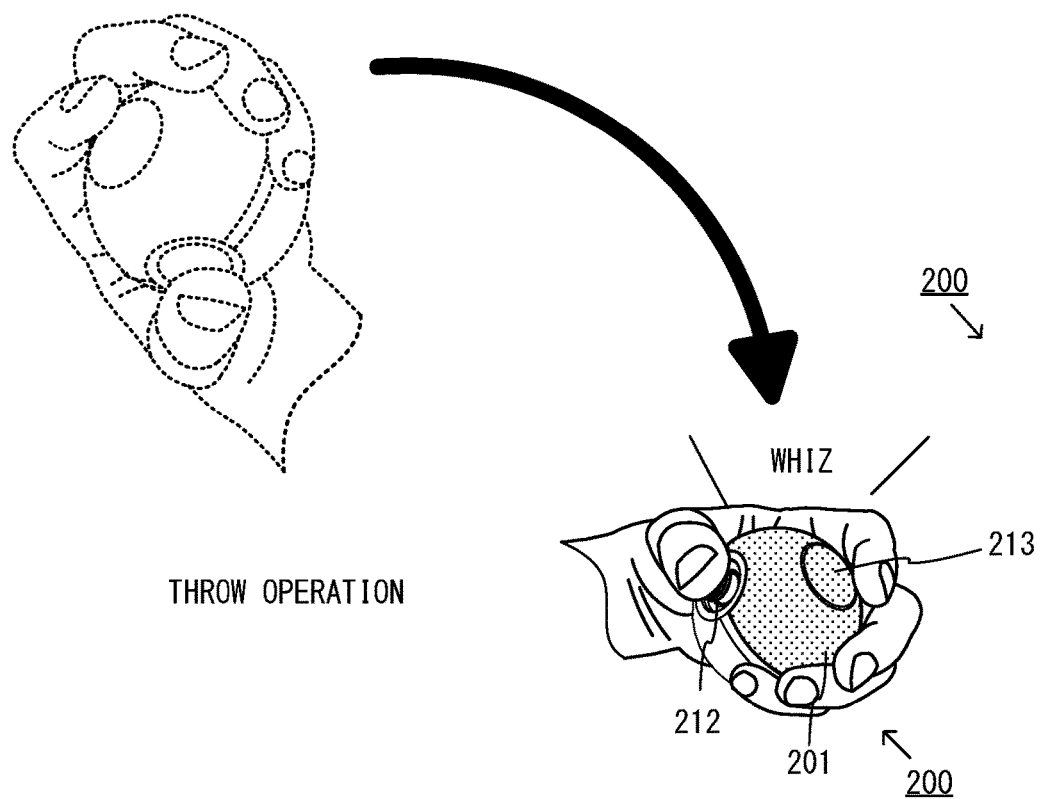
THROW OPERATION

FIG. 15
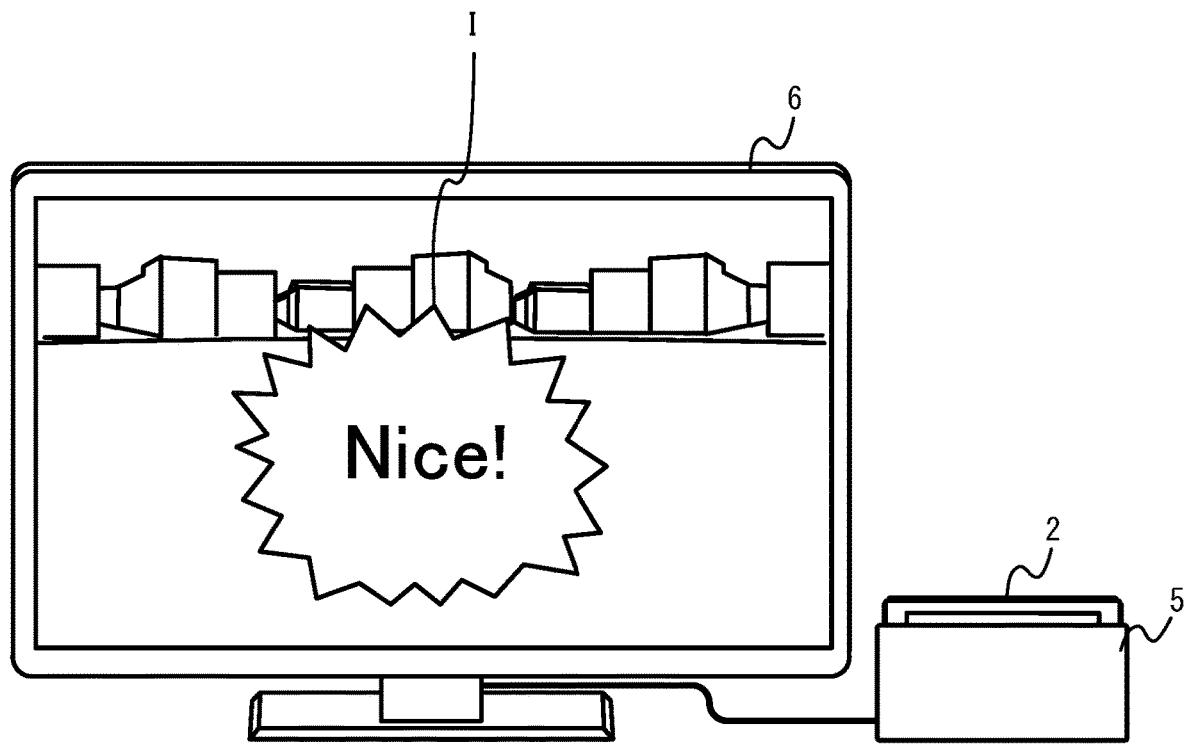
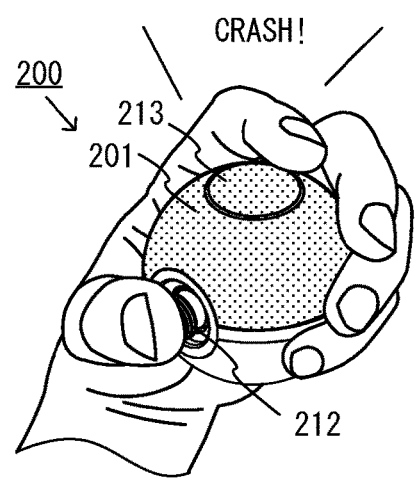

FIG. 16
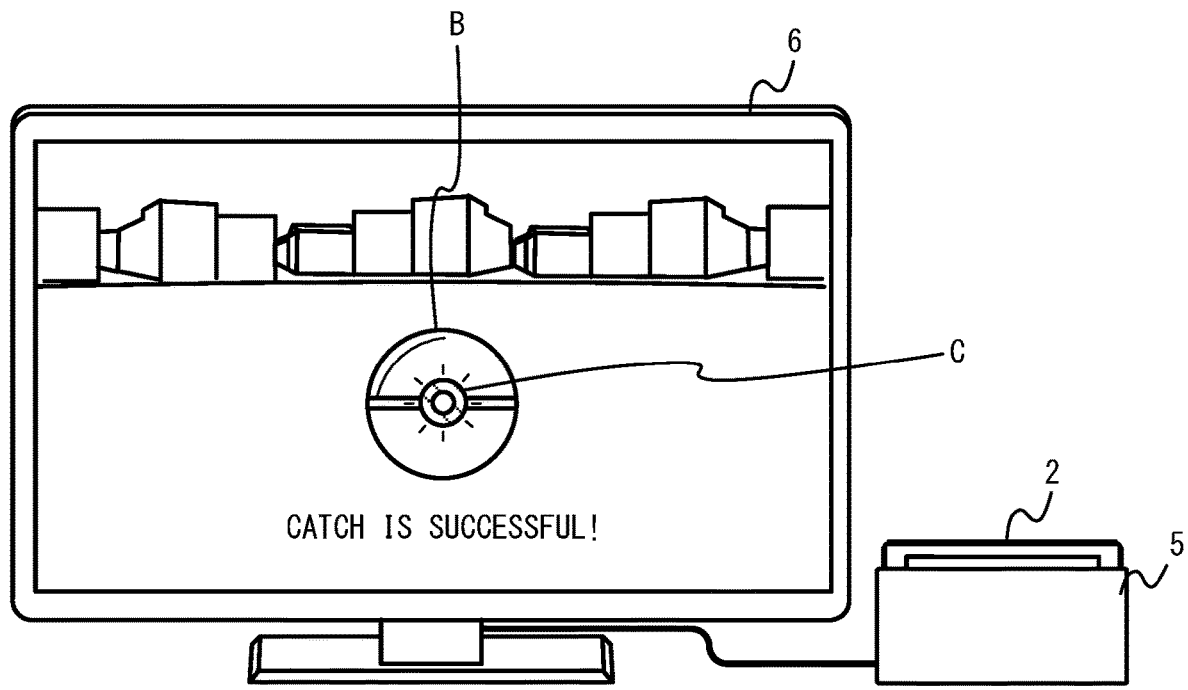
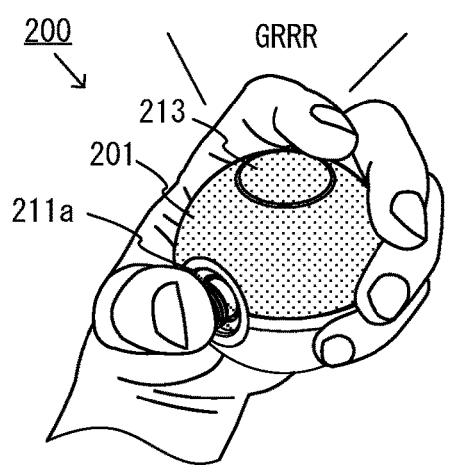

GAME SYSTEM, GAME PROCESSING METHOD, STORAGE MEDIUM HAVING STORED THEREIN GAME PROGRAM, GAME APPARATUS, AND GAME CONTROLLER

CROSS REFERENCE TO RELATED APPLICATION

The disclosure of Japanese Patent Application No. 2018-192743, filed on Oct. 11, 2018, is incorporated herein by reference.

FIELD

The technology shown here relates to a game system, a game processing method, a storage medium having stored therein a game program, a game apparatus, and a game controller for performing a process corresponding to an operation using a game controller.

BACKGROUND AND SUMMARY

Conventionally, there is a game system where sensing information regarding a pedometer corresponding to a sensing result by a shake is transmitted to a game apparatus, and game processing is performed based on the sensing information.

In the game system, however, there is room for improvement in increasing a realistic feeling of a game performed by game processing.

Therefore, it is an object of an exemplary embodiment to provide a game system, a game processing method, a storage medium having stored therein a game program, a game apparatus, and a game controller that are capable of increasing a realistic feeling in a game where a game controller is used.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a game system according to an exemplary embodiment, a game system includes a game controller having an inertial sensor and configured to transmit first data based on an output from the inertial sensor to outside, and a game apparatus configured to communicate with the game controller. The game apparatus includes at least one processor configured to: receive the first data transmitted from the game controller; based on the first data, execute game processing for catching a predetermined game character; generate second data corresponding to the game character as a target to be caught in the game processing; and transmit the second data to the game controller. The game controller includes a receiver, a sound outputter, and a sound outputter. The receiver receives the second data transmitted from the game apparatus. The sound outputter outputs a sound. The sound output controller, based on the second data received by the receiver, causes the sound outputter to output a sound corresponding to the caught game character.

Based on the above, a sound corresponding to a game character caught by operating a game controller (e.g., the cry) is output from the game controller. Thus, it is possible to increase a realistic feeling in a game where a game character is caught.

Further, the game controller may further include a light-emitting section and a light emission control means. The light emission controller, based on the second data, causes the light emitter to emit light in a color corresponding to the caught game character.

Based on the above, the game controller emits light in a color corresponding to the game character caught by operating the game controller. Thus, it is possible to further increase the realistic feeling in the game where the game character is caught.

Further, the execution of a game where the game character is caught may be performed by determining success or failure of the catch of the game character.

Based on the above, in accordance with the success or failure of the catch of the game character, it is possible to control a sound to be output from the game controller.

Further, the at least one processor of the game apparatus may be further configured to, when it is determined that the catch of the game character is successful, further transmit, to the game controller, third data for outputting a sound corresponding to the game character. In this case, the receiver of the game controller may further receive the third data. In accordance with the fact that the receiver receives the third data, and based on the second data, the sound output controller may cause the sound outputter to output a sound corresponding to the game character of which the catch is successful.

Based on the above, when the catch of the game character is successful, the game controller can control the sound of the game character. Thus, it is possible to increase a realistic feeling in the situation where the catch of the game character is successful.

Further, the game controller may further include a light-emitting section and a light emission controller. The light emission controller, based on the second data, may cause the light emitter to emit light in a color corresponding to the caught game character. In this case, the at least one processor of the game apparatus may be further configured to, when it is determined that the catch of the game character is successful, transmit, to the game controller, fourth data for causing the light emitter to emit light in a color corresponding to the game character. The receiver of the game controller may further receive the fourth data. In accordance with the fact that the receiver receives the fourth data, and based on the second data, the light emission controller may cause the light emitter to emit light in a color corresponding to the game character of which the catch is successful.

Based on the above, when the catch of the game character is successful, the game controller can be caused to emit light in a color corresponding to the game character. Thus, it is possible to increase a realistic feeling in the situation where the catch of the game character is successful.

Further, the at least one processor of the game apparatus may be further configured to transmit, to the game controller, data indicating a result of determining the success or failure of the catch of the game character. The light emission controller may cause the light emitter to emit light in a color corresponding to the success or failure of the catch of the game character corresponding to the result of the determination.

Based on the above, it is possible to notify a user operating the game controller of the success or failure of the catch.

Further, the at least one processor of the game apparatus may be further configured to, before the success or failure of the catch of the game character is determined, transmit the second data corresponding to the game character to the game controller.

Based on the above, it is possible to reduce the influence of delay related to the transmission and reception of second data.

Further, the at least one processor of the game apparatus may be further configured to, before the catch, identify the game character as the target to be caught. In this case, before the success or failure of the catch of the game character is determined, the at least one processor of the game apparatus may transmit the second data corresponding to the identified game character to the game controller.

Based on the above, at the time when the game character is identified before being caught, second data corresponding to the identified game character is transmitted and received. Thus, it is possible to efficiently transmit and receive the second data.

Further, the game controller may further include a vibrator. In this case, the game system may further include a processor configured to, when a predetermined operation is performed on the game controller to catch the game character, vibrate the vibrator based on an output from the inertial sensor of the game controller.

Based on the above, not only a sound corresponding to the game character caught by operating the game controller but also a vibration is output from the game controller. Thus, it is possible to further increase the realistic feeling in the game where the game character is caught.

Further, the game controller may further include a vibrator. In this case, the game system may further include a processor configured to, before success or failure of the catch of the game character is finalized, intermittently vibrate the vibrator of the game controller.

Based on the above, before a user is informed of the success or failure of the catch, the game controller intermittently vibrates. Thus, it is possible to increase the sense of expectation of the user operating the game controller.

Further, in accordance with the fact that the game character is caught, and based on the second data, the sound output controller may cause the sound outputter to output a sound corresponding to the caught game character, and based on the second data and an output from the inertial sensor, further cause the sound outputter to output a sound corresponding to the caught game character after the catch, or based on after-the-catch data corresponding to the caught game character and an output from the inertial sensor that are received from the game apparatus separately from the second data, further cause the sound outputter to output a sound corresponding to the caught game character after the catch.

Based on the above, even after a catch game ends, it is possible to output a sound corresponding to the game character caught by operating game controller from the game controller.

Further, the game controller may further include a direction inputter. The at least one processor of the game apparatus may be further configured to, based on an operation on the direction inputter, execute a process of searching for the predetermined game character in a virtual world. In this case, the at least one processor of the game apparatus may execute game processing for catching the searched-for game character based on the first data. In accordance with the fact that the searched-for game character is caught, and based on the second data, the sound output controller may cause the sound outputter to output a sound corresponding to the caught game character.

Based on the above, it is possible to achieve a game where a game character searched for by operating a direction input section of the game controller is caught.

Further, the at least one processor of the game apparatus may be further configured to: display on a display screen a virtual space where an object that resembles an external appearance of the game controller is placed; and during the execution of the game processing, based on the first data received from the game controller, control a position and/or an orientation of the object in the virtual space. In this case, based on the first data received from the game controller, the position and/or the orientation of the object in the virtual space are controlled to correspond to a position and/or an orientation of the game controller in real space.

Based on the above, an object corresponding to the motion of the game controller in real space is displayed on a display screen. Thus, it is possible to give a user a feeling as if directly moving the object in a virtual space.

Further, the exemplary embodiment may be carried out in the forms of a game processing method, a storage medium having stored therein a game program, a game apparatus, and a game controller.

According to the exemplary embodiment, it is possible to increase a realistic feeling in a game where a game character is caught.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 is a top front perspective view of a non-limiting example of a spherical controller 200;

FIG. 12 is a diagram showing a non-limiting example of the state where a game where the game system 1 is used by operating the spherical controller 200 is performed;

FIG. 13 is a diagram showing a non-limiting example of the state where the game where the game system 1 is used by operating the spherical controller 200 is performed;

FIG. 14 is a diagram showing a non-limiting example of the state where the game where the game system 1 is used by operating the spherical controller 200 is performed;

FIG. 15 is a diagram showing a non-limiting example of the state where the game where the game system 1 is used by operating the spherical controller 200 is performed;

FIG. 16 is a diagram showing a non-limiting example of the state where the game where the game system 1 is used by operating the spherical controller 200 is performed;

DETAILED DESCRIPTION OF NON-LIMITING EXAMPLE EMBODIMENTS

Before a spherical controller according to an exemplary embodiment is described, a description is given of a game system where the spherical controller is used. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
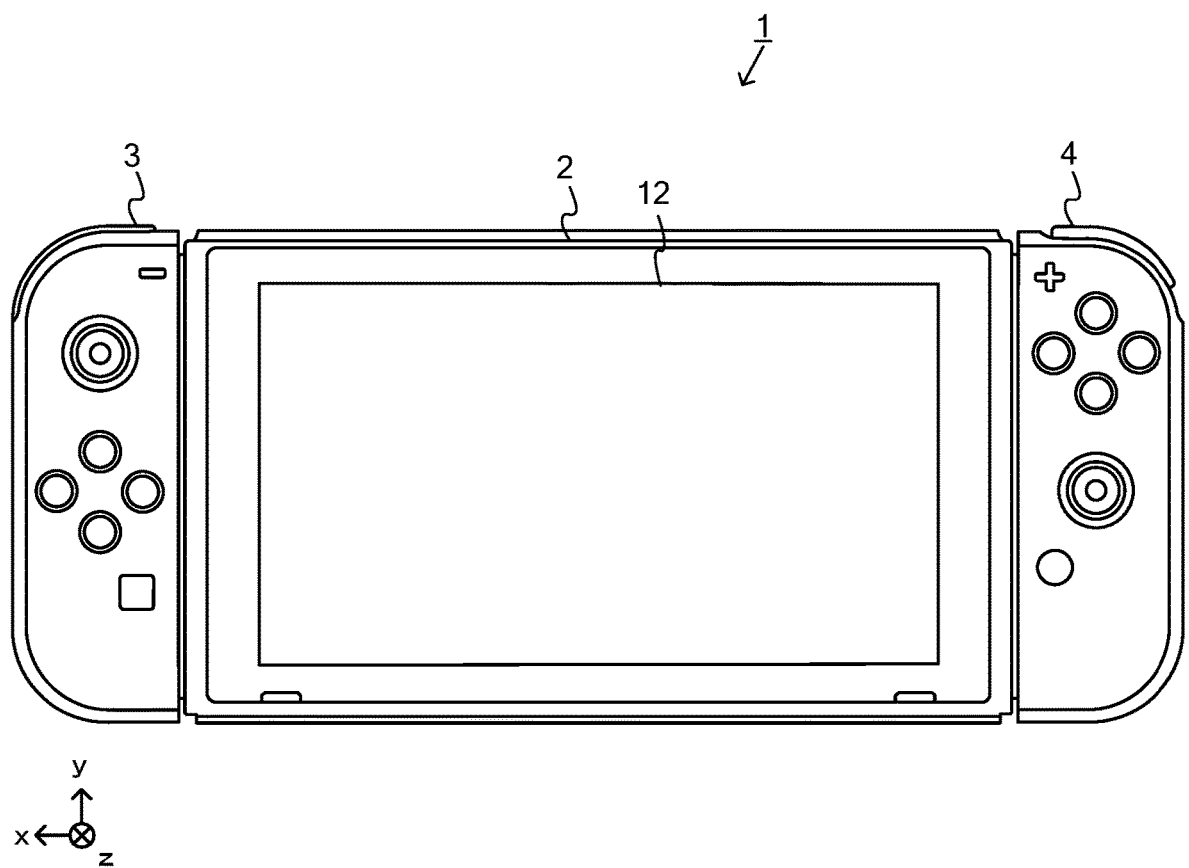
FIG. 1 is a diagram showing a non-limiting example of the state where a left controller 3 and a right controller 4 are attached to a main body apparatus 2 in an example of a game system 1 according to an exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
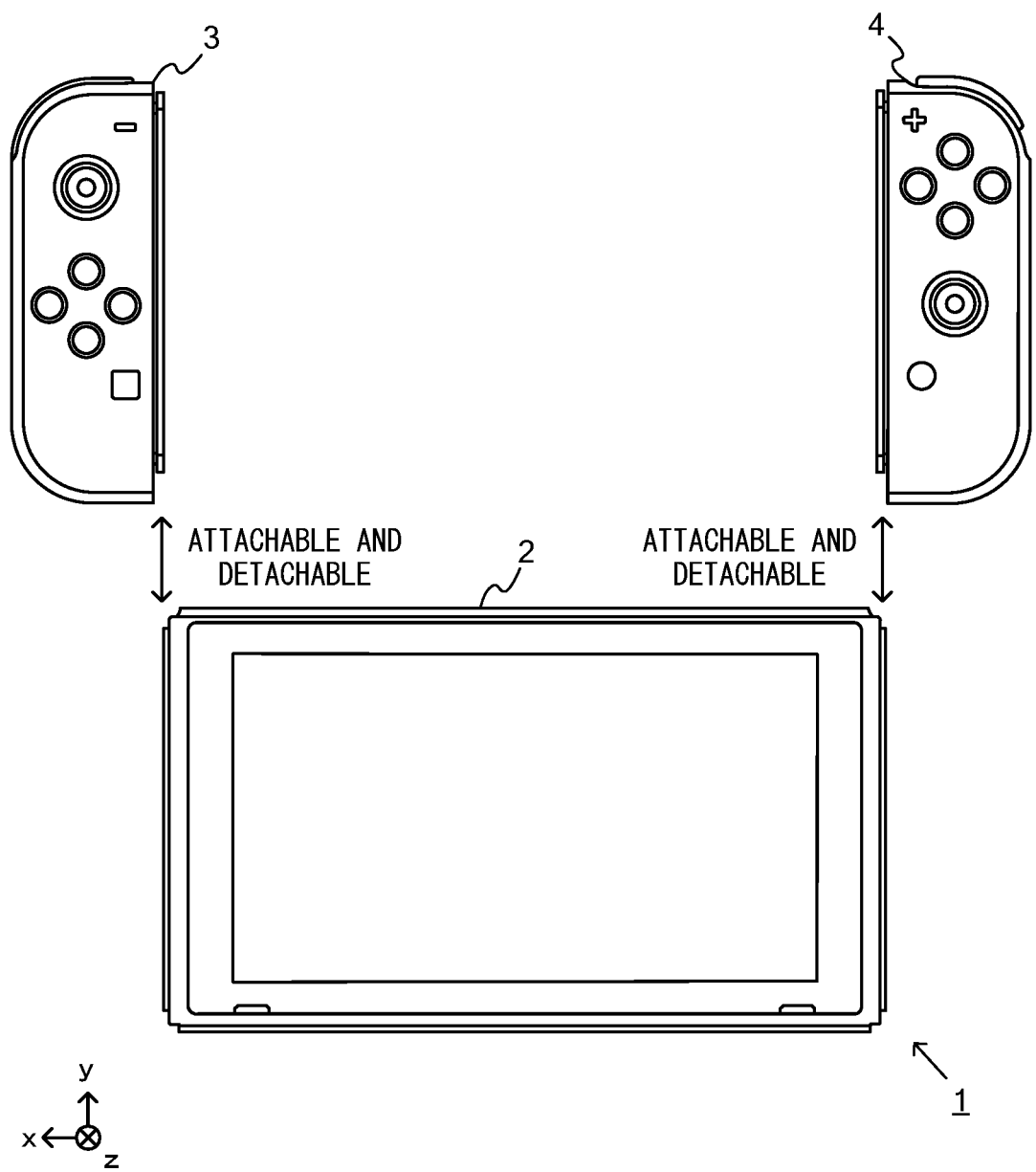
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
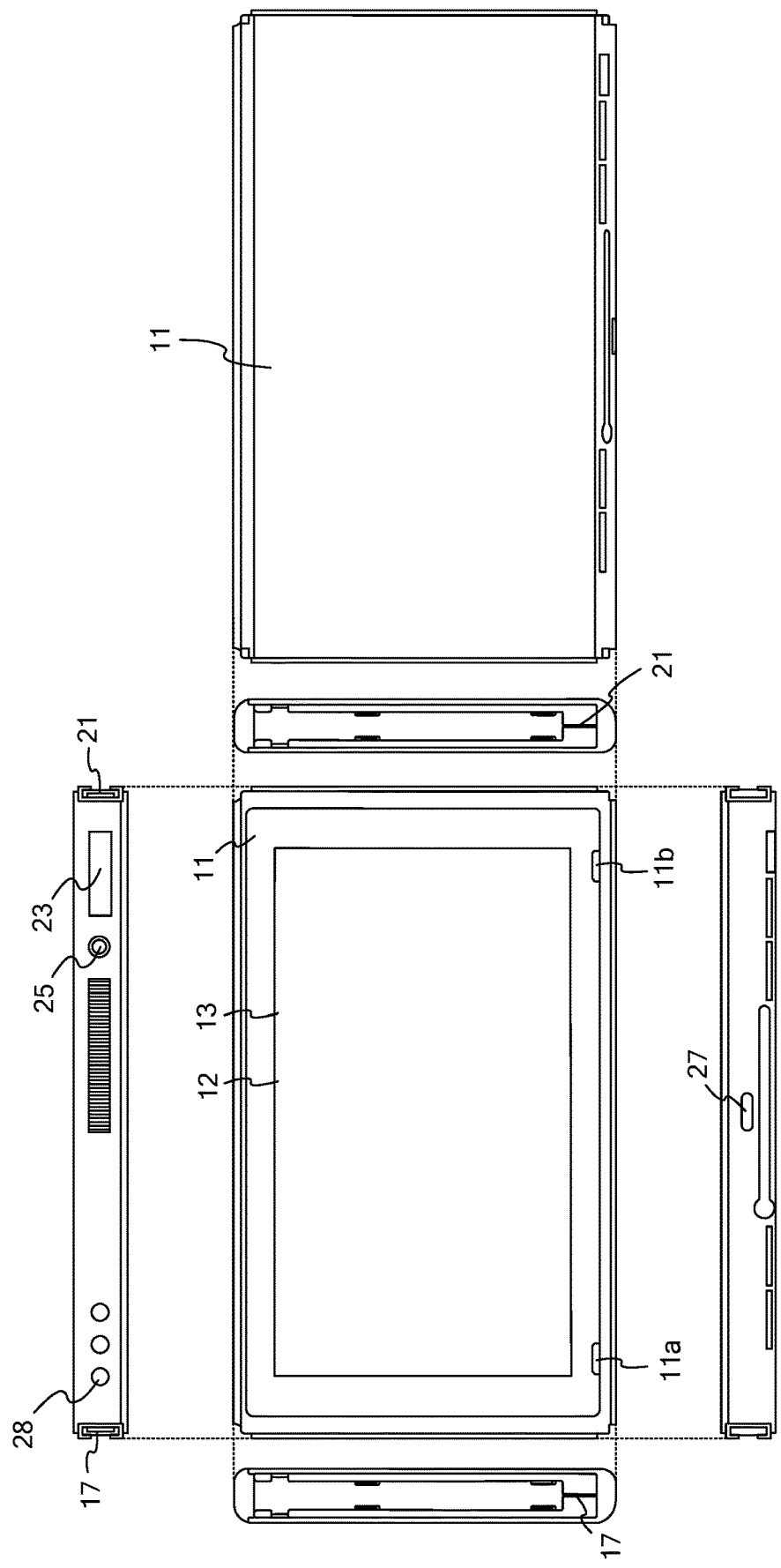
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
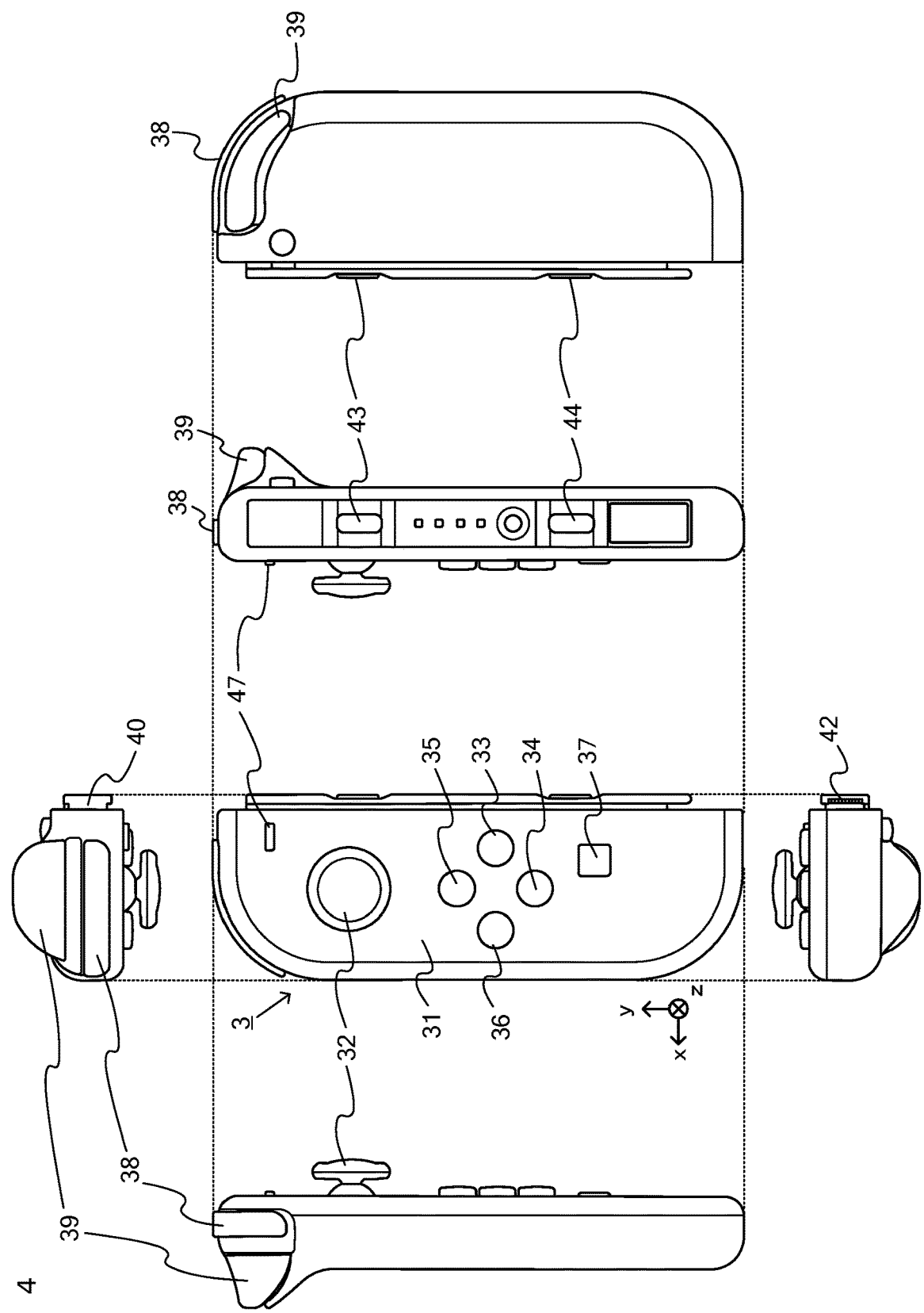
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
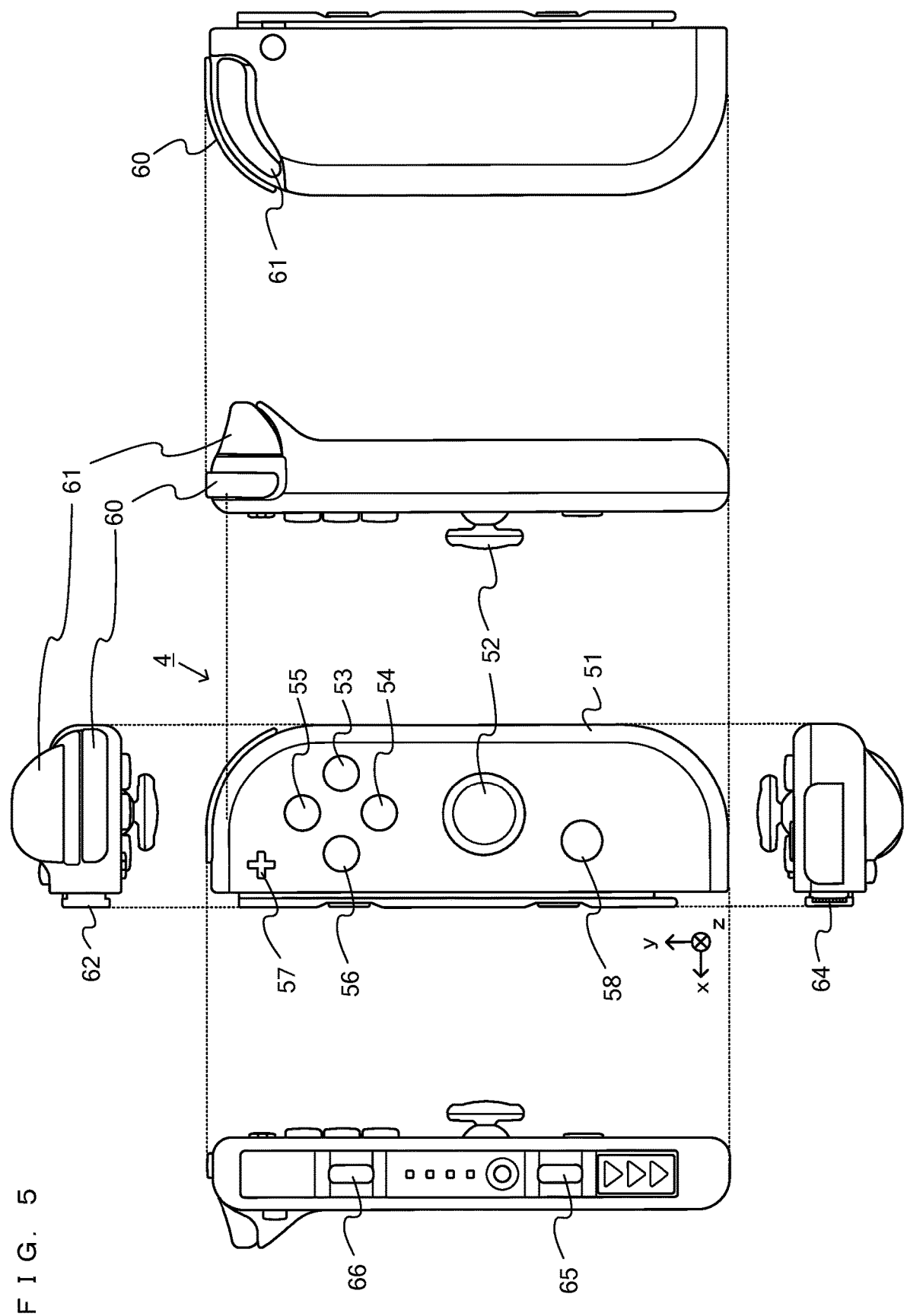
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
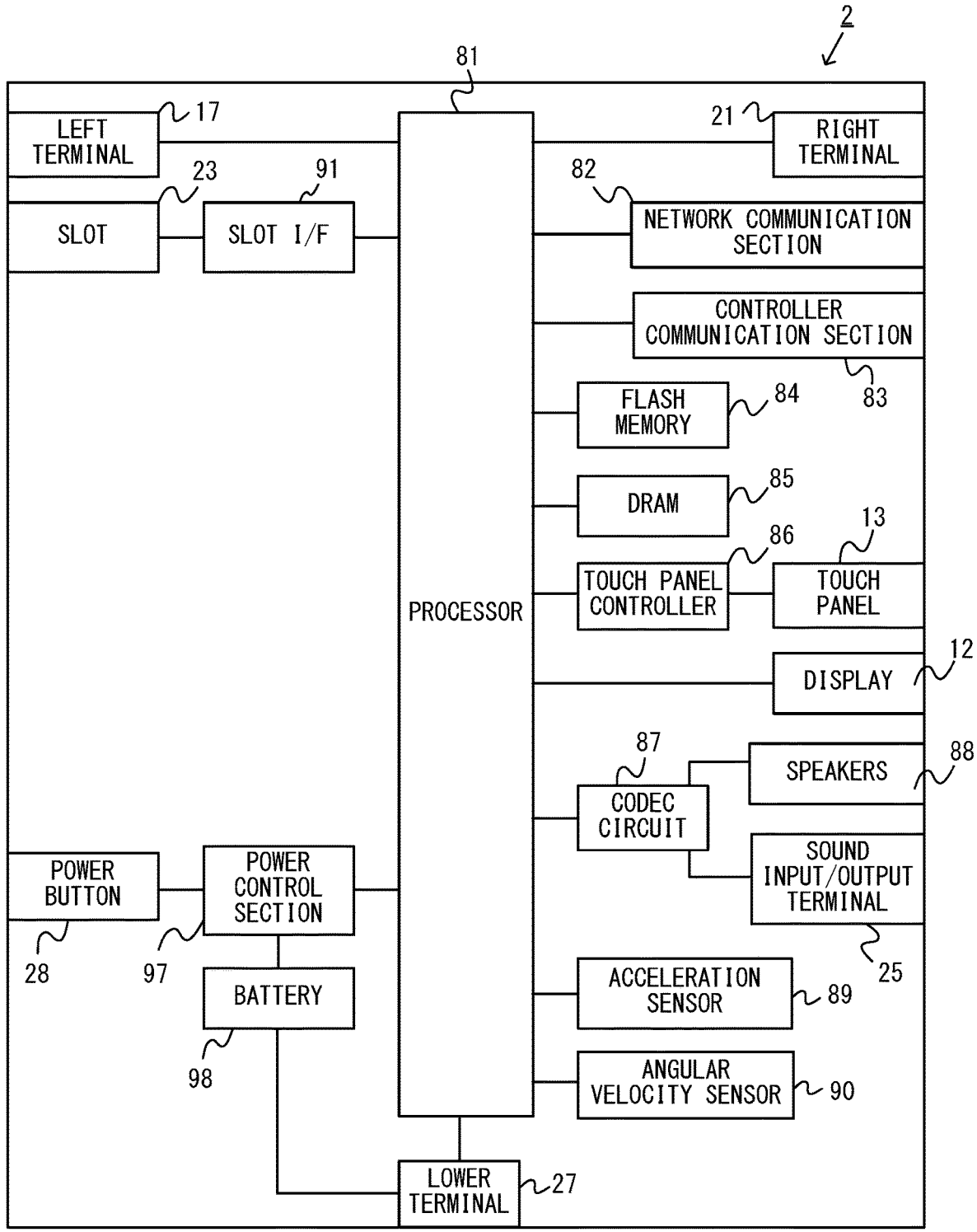
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
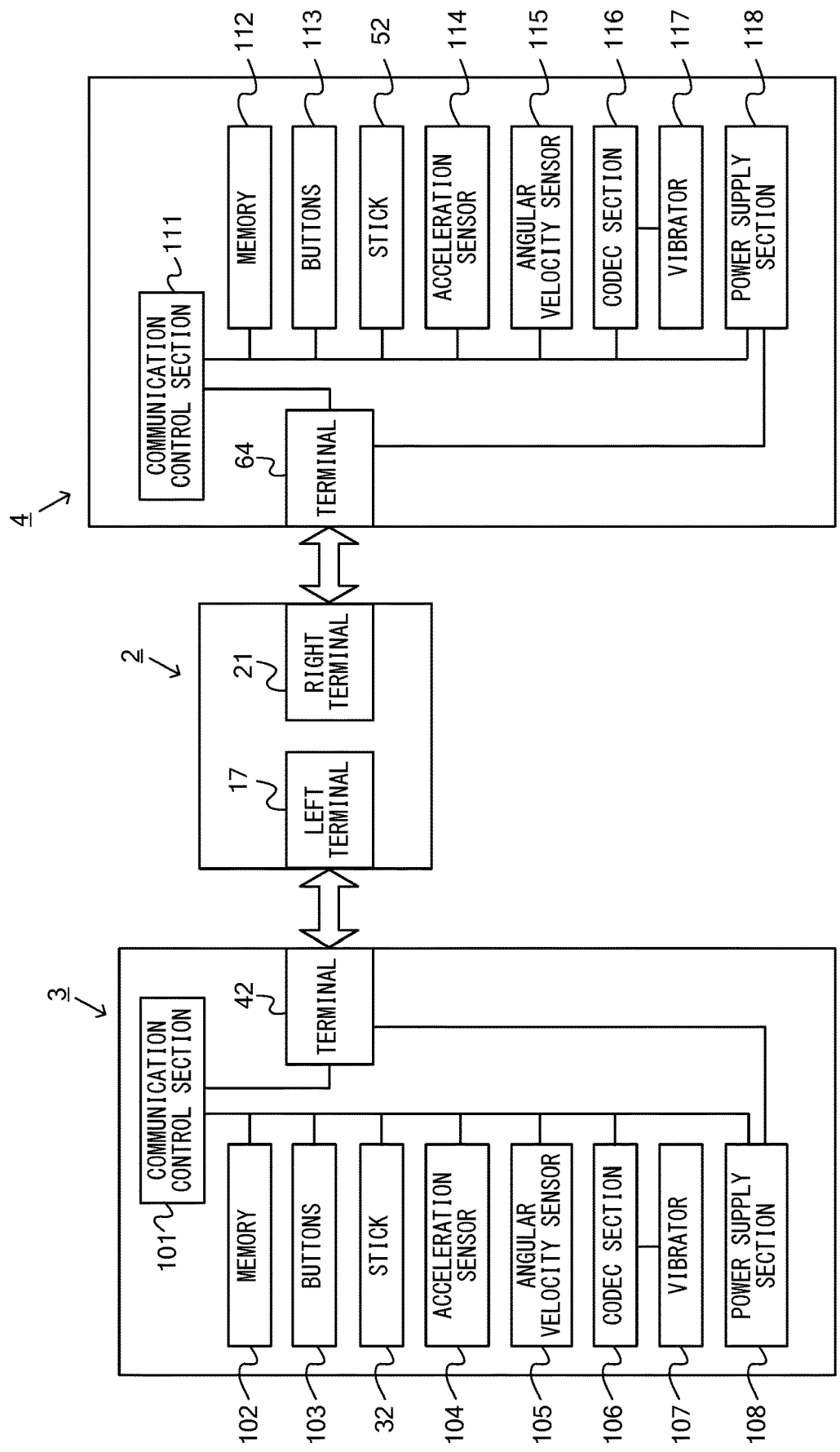
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor 6.

Next, the spherical controller according to an example of the exemplary embodiment is described. In the exemplary embodiment, the spherical controller can be used, instead of the controllers 3 and 4, as an operation device for giving an instruction to the main body apparatus 2, and can also be used together with the controllers 3 and/or 4. The details of the spherical controller are described below.

FIG. 8 is a perspective view showing an example of the spherical controller. FIG. 8 is a top front perspective view of a spherical controller 200. As shown in FIG. 8, the spherical controller 200 includes a spherical controller main body portion 201 and a strap portion 202. For example, the user uses the spherical controller 200 in the state where the user holds the controller main body portion 201 while hanging the strap portion 202 from their arm.

Here, in the following description of the spherical controller 200 (specifically, the controller main body portion 201), an up-down direction, a left-right direction, and a front-back direction are defined as follows (see FIG. 8). That is, the direction from the center of the spherical controller main body portion 201 to a joystick 212 is a front direction (i.e., a negative z-axis direction shown in FIG. 8), and a direction opposite to the front direction is a back direction (i.e., a positive z-axis direction shown in FIG. 8). Further, a direction that matches the direction from the center of the controller main body portion 201 to the center of an operation surface 213 when viewed from the front-back direction is an up direction (i.e., a positive y-axis direction shown in FIG. 8), and a direction opposite to the up direction is a down direction (i.e., a negative y-axis direction shown in FIG. 8). Further, the direction from the center of the controller main body portion 201 to a position at the right end of the controller main body portion 201 as viewed from the front side is a right direction (i.e., a positive x-axis direction shown in FIG. 8), and a direction opposite to the right direction is a left direction (i.e., a negative x-axis direction shown in FIG. 8). It should be noted that the up-down direction, the left-right direction, and the front-back direction are orthogonal to each other.

Figure 9:
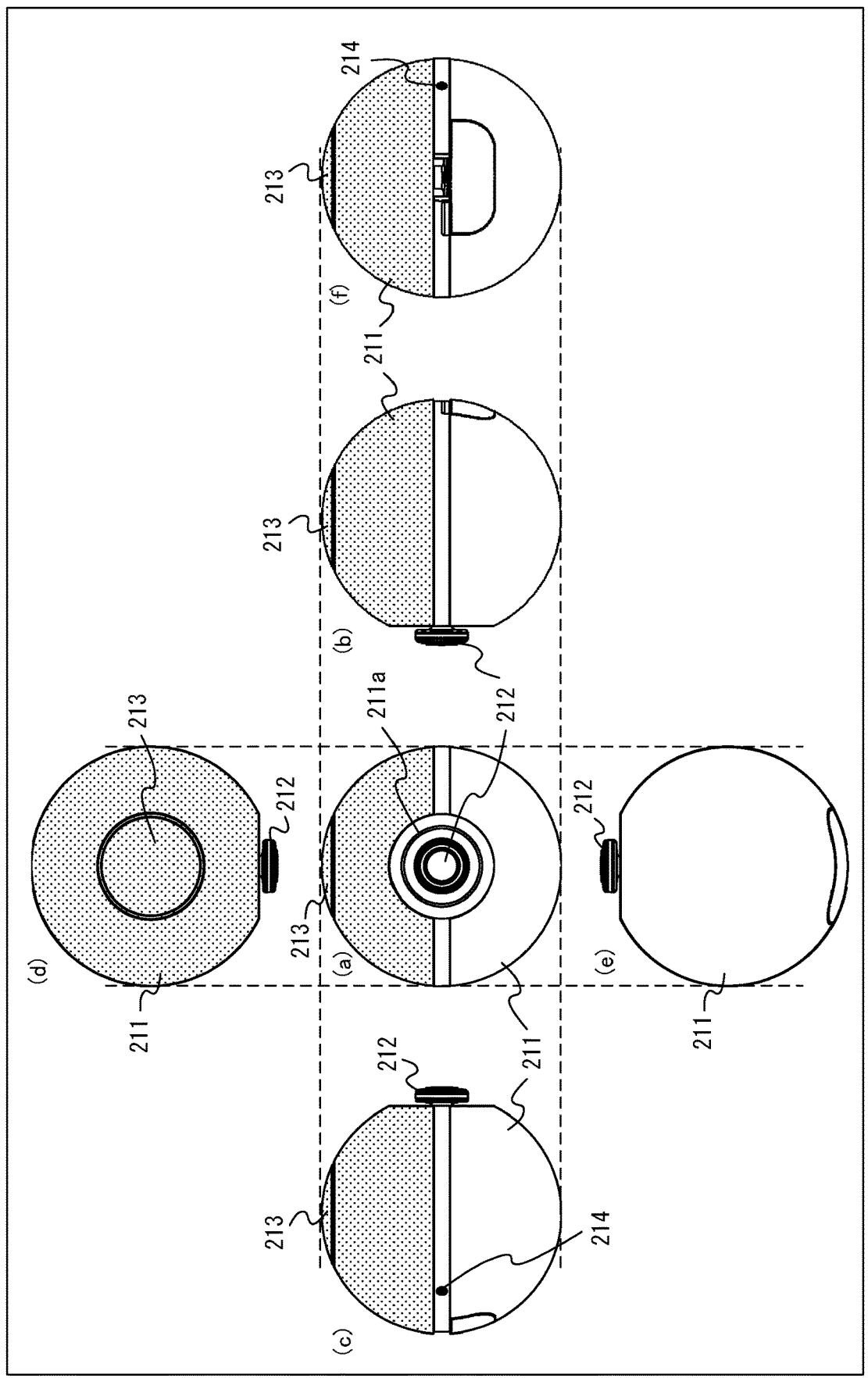
FIG. 9 is six orthogonal views showing a non-limiting example of the spherical controller 200.

FIG. 9 is six orthogonal views showing an example of the controller main body portion. In FIG. 9, (a) is a front view, (b) is a right side view, (c) is a left side view, (d) is a plan view, (e) is a bottom view, and (0 is a rear view.

As shown in FIG. 9, the controller main body portion 201 has a spherical shape. Here, the "spherical shape" means a shape of which the external appearance looks roughly like a sphere. The spherical shape may be a true spherical shape, or may be a shape having a true spherical surface with a missing portion and/or a shape having a true spherical surface with a protruding portion. The spherical shape may be so shaped that a part of the surface of the spherical shape is not a spherical surface. Alternatively, the spherical shape may be a shape obtained by slightly distorting a true sphere.

As shown in FIG. 9, the controller main body portion 201 includes a spherical casing 211. In the exemplary embodiment, the controller main body portion 201 (in other words, the casing 211) is of such a size that the user can hold the controller main body portion 201 with one hand (see FIG. 10). The diameter of the casing 211 is set in the range of 4 cm to 10 cm, for example.

In the exemplary embodiment, the casing 211 is so shaped that a part of a sphere is notched, and a part of the sphere has a hole. To provide an operation section (e.g., the joystick 212 and a restart button 214) on the casing 211 or attach another component (e.g., the strap portion 202) to the casing 211, a hole is provided in the casing 211.

Figure 10:
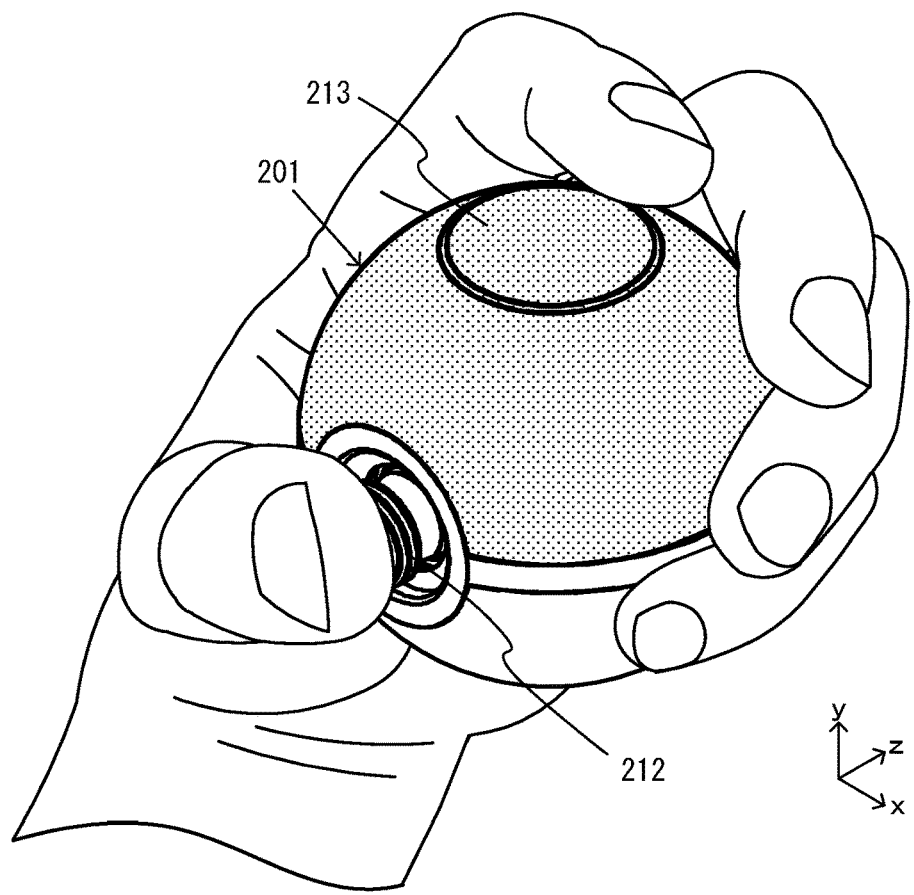
FIG. 10 is a diagram showing a non-limiting example of the state where a user holds the spherical controller 200.

Specifically, in the exemplary embodiment, a front end portion of the casing 211 is a flat surface (a front end surface) (see (b) to (e) of FIG. 9). It can be said that the casing 211 has a shape obtained by cutting a sphere along a flat surface including the front end surface, thereby cutting off a front end portion of the sphere. As shown in FIG. 10, an opening 211a is provided on the front end surface of the casing 211, and the joystick 212, which is an example of a direction input section, is provided, exposed through the opening 211a. In the exemplary embodiment, the shape of the opening 211a is a circle. In another exemplary embodiment, the shape of the opening 211a is any shape. For example, the opening 211a may be polygonal (specifically, triangular, rectangular, pentagonal, or the like), elliptical, or star-shaped.

The joystick 212 includes a shaft portion that can be tilted in any direction by the user. Further, the joystick 212 is a joystick of a type that allows the operation of pushing down the shaft portion, in addition to the operation of tilting the shaft portion. It should be noted that in another exemplary embodiment, the joystick 212 may be an input device of another type. It should be noted that in the exemplary embodiment, the joystick 212 is used as an example of a direction input section provided in a game controller.

The joystick 212 is provided in the front end portion of the casing 211. As shown in FIG. 9, the joystick 212 is provided such that a part of the joystick 212 (specifically, the shaft portion) is exposed through the opening 211a of the casing 211. Thus, the user can easily perform the operation of tilting the shaft portion. It should be noted that in another exemplary embodiment, the joystick 212 may be exposed through the opening 211a provided in the flat surface, and may not be provided protruding from the flat surface. The position of the joystick 212 is the center of the spherical controller main body portion 201 in the up-down direction and the left-right direction (see (a) of FIG. 9). As described above, the user can perform a direction input operation for tilting the shaft portion using a game controller of which the outer shape is spherical. That is, according to the exemplary embodiment, it is possible to perform a more detailed operation using a game controller of which the outer shape is spherical.

Further, as shown in (d) of FIG. 9, the operation surface 213 is provided in an upper end portion of the casing 211. The position of the operation surface 213 is the center of the spherical controller main body portion 201 in the left-right direction and the front-back direction (see (d) of FIG. 9). In the exemplary embodiment, the operation surface 213 (in other words, the outer circumference of the operation surface 213) has a circular shape formed on the spherical surface of the casing 211. In another exemplary embodiment, however, the shape of the operation surface 213 is any shape, and may be a rectangle or a triangle, for example. Although the details will be described later, the operation surface 213 is configured to be pressed from the above.

In the exemplary embodiment, the operation surface 213 is formed in a unified manner with the surface of the casing 211. The operation surface 213 is a part of an operation section (also referred to as an "operation button") that allows a push-down operation. The operation surface 213, however, can also be said to be a part of the casing 211 because the operation surface 213 is formed in a unified manner with a portion other than the operation surface 213 of the casing 211. It should be noted that in the exemplary embodiment, the operation surface 213 can be deformed by being pushed down. An operation section including the operation surface 213 is input (i.e., an input is provided to the operation section) by pushing down the operation surface 213.

With reference to FIG. 10, the positional relationship between the joystick 212 and the operation surface 213 is described below. FIG. 10 is a diagram showing an example of the state where the user holds the controller main body portion. As shown in FIG. 10, the user can operate the joystick 212 with their thumb and operate the operation surface 213 with their index finger in the state where the user holds the controller main body portion 201 with one hand. It should be noted that FIG. 10 shows as an example a case where the user holds the controller main body portion 201 with their left hand. However, also in a case where the user holds the controller main body portion 201 with their right hand, similarly to the case where the user holds the controller main body portion 201 with their left hand, the user can operate the joystick 212 with their right thumb and operate the operation surface 213 with their right index finger.

As described above, in the exemplary embodiment, the operation surface 213 that allows a push-down operation is provided. Consequently, using a game controller of which the outer shape is spherical, the user can perform both a direction input operation using the joystick and a push-down operation on the operation surface 213. Consequently, it is possible to perform various operations using a game controller of which the outer shape is spherical.

Further, the controller main body portion 201 includes the restart button 214. The restart button 214 is a button for giving an instruction to restart the spherical controller 200. As shown in (c) and (f) of FIG. 9, the restart button 214 is provided at a position on the left side of the back end of the casing 211. The position of the restart button 214 in the up-down direction is the center of the spherical controller main body portion 201. The position of the restart button 214 in the front-back direction is a position behind the center of the spherical controller main body portion 201. It should be noted that in another exemplary embodiment, the position of the restart button 214 is any position. For example, the restart button 214 may be provided at any position on the back side of the casing 211.

Further, in the exemplary embodiment, a light-emitting section (i.e., a light-emitting section 248 shown in FIG. 11) is provided inside the casing 211, and light is emitted from the opening 211a of the casing 211 to outside the casing 211. For example, if the light-emitting section 248 within the casing 211 emits light, light having passed through a light-guiding portion (not shown) is emitted from the opening 211a to outside the casing 211, and a portion around the joystick 212 appears to shine. As an example, the light-emitting section 248 includes three light-emitting elements (e.g., LEDs). The light-emitting elements emit beams of light of colors different from each other. Specifically, a first light-emitting element emits red light, a second light-emitting element emits green light, and a third light-emitting element emits blue light. Beams of light from the respective light-emitting elements of the light-emitting section 248 travel in the light-guiding portion and are emitted from the opening 211a. At this time, the beams of light of the respective colors from the respective light-emitting elements are emitted in a mixed manner from the opening 211a. Thus, light obtained by mixing the colors is emitted from the opening 211a. This enables the spherical controller 200 to emit beams of light of various colors. It should be noted that in the exemplary embodiment, the light-emitting section 248 includes three light-emitting elements. In another exemplary embodiment, the light-emitting section 248 may include two or more light-emitting elements, or may include only one light-emitting element.

Further, in the exemplary embodiment, a vibration section 271 is provided within the casing 211. The vibration section 271 is a vibrator that generates a vibration, thereby vibrating the casing 211. For example, the vibration section 271 is a voice coil motor. That is, the vibration section 271 can generate a vibration in accordance with a signal input to the vibration section 271 itself and can also generate a sound in accordance with the signal. For example, when a signal having a frequency in the audible range is input to the vibration section 271, the vibration section 271 generates a vibration and also generates a sound (i.e., an audible sound). For example, when a sound signal indicating the voice (or the cry) of a character that appears in a game is input to the vibration section 271, the vibration section 271 outputs the voice (or the cry) of the character. Further, when a signal having a frequency outside the audible range is input to the vibration section 271, the vibration section 271 generates a vibration. It should be noted that a signal to be input to the vibration section 271 can be said to be a signal indicating the waveform of a vibration that should be performed by the vibration section 271, or can also be said to be a sound signal indicating the waveform of a sound that should be output from the vibration section 271. A signal to be input to the vibration section 271 may be a vibration signal intended to cause the vibration section 271 to perform a vibration having a desired waveform, or may be a sound signal intended to cause the vibration section 271 to output a desired sound, or may be a signal intended to both cause the vibration section 271 to output a desired sound and cause the vibration section 271 to perform a vibration having a desired waveform. In the exemplary embodiment, sound data (catch target reproduction data and common reproduction data) for causing the vibration section 271 to output a sound is stored within the casing 211. The sound data, however, includes at least a sound signal having a frequency in the audible range for causing the vibration section 271 to output a desired sound, and may include a vibration signal having a frequency outside the audible range for causing the vibration section 271 to perform a vibration having a desired waveform.

As described above, in the exemplary embodiment, the vibration section 271 can output a vibration and a sound. Thus, it is possible to output a vibration and a sound from the spherical controller 200 and also simplify the internal configuration of the controller main body portion 201. If such effects are not desired, a speaker (a sound output section) for outputting a sound and a vibrator (a vibration output section) for performing a vibration may be provided separately from each other in the spherical controller 200. It should be noted that in the exemplary embodiment, the vibration section 271 is used as an example of a sound output section. The sound output section may double as a vibration section, or the sound output section and the vibration section may be provided separately.

Further, in the exemplary embodiment, the spherical controller 200 includes an inertial sensor 247 (e.g., an acceleration sensor and/or an angular velocity sensor) provided near the center of the casing 211. Based on this, the inertial sensor 247 can detect accelerations in three axial directions, namely the up-down direction, the left-right direction, and the front-back direction under equal conditions and/or angular velocities about the three axial directions under equal conditions. This can improve the acceleration detection accuracy and/or the angular velocity detection accuracy of the inertial sensor 247.

Figure 11:
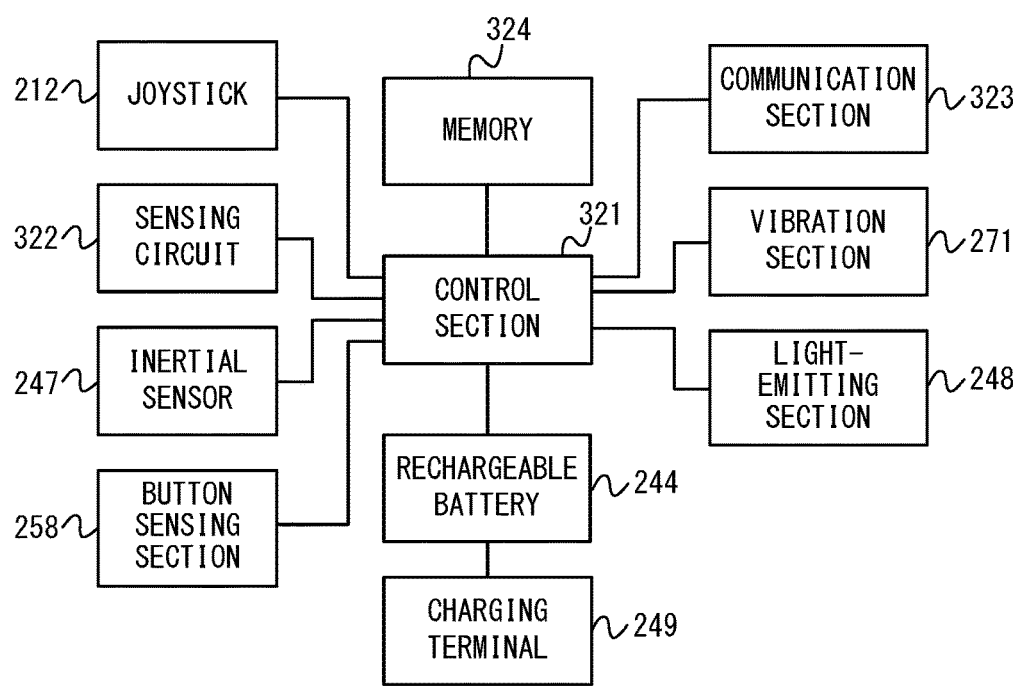
FIG. 11 is a block diagram showing a non-limiting example of the electrical connection relationship of the spherical controller 200.

FIG. 11 is a block diagram showing an example of the electrical connection relationship of the spherical controller 200. As shown in FIG. 11, the spherical controller 200 includes a control section 321 and a memory 324. The control section 321 includes a processor. In the exemplary embodiment, the control section 321 controls a communication process with the main body apparatus 2, controls a vibration and a sound to be output from the vibration section 271, controls light to be emitted from the light-emitting section 248, or controls the supply of power to electrical components shown in FIG. 11. The memory 324 is composed of a flash memory or the like, and the control section 321 executes firmware stored in the memory 324, thereby executing various processes. Further, in the memory 324, sound data for outputting a sound from the vibration section 271 (a voice coil motor) and light emission data for emitting beams of light of various colors from the light-emitting section 248 may be stored. It should be noted that in the memory 324, data used in a control operation may be stored, or data used in an application (e.g., a game application) using the spherical controller 200 that is executed by the main body apparatus 2 may be stored.

The control section 321 is electrically connected to input means included in the spherical controller 200. In the exemplary embodiment, the spherical controller 200 includes as the input means the joystick 212, a sensing circuit 322, the inertial sensor 247, and a button sensing section 258. The sensing circuit 322 is a sensing circuit that senses that an operation on the operation surface 213 is performed. In the button sensing section 258, a contact that senses an operation on the restart button 214, and a sensing circuit that senses that the restart button 214 comes into contact with the contact are provided. The control section 321 acquires, from the input means, information regarding (in other words, data) an operation performed on the input means.

The control section 321 is electrically connected to a communication section 323. The communication section 323 includes an antenna and wirelessly communicates with the main body apparatus 2. That is, the control section 321 transmits information (in other words, data) to the main body apparatus 2 using the communication section 323 (in other words, via the communication section 323) and receives information (in other words, data) from the main body apparatus 2 using the communication section 323. For example, the control section 321 transmits information acquired from the joystick 212, the sensing circuit 322, and the inertial sensor 247 to the main body apparatus 2 via the communication section 323. It should be noted that in the exemplary embodiment, the communication section 323 (and/or the control section 321) functions as a transmission section that transmits information regarding an operation on the joystick 212 to the main body apparatus 2. Further, the communication section 323 (and/or the control section 321) functions as a transmission section that transmits information regarding an operation on the operation surface 213 to the main body apparatus 2. Further, the communication section 323 (and/or the control section 321) functions as a transmission section that transmits, to the main body apparatus 2, information output from the inertial sensor 247. In the exemplary embodiment, the communication section 323 performs communication compliant with the Bluetooth (registered trademark) standard with the main body apparatus 2. Further, in the exemplary embodiment, as an example of reception means of a game controller, the communication section 323 (and/or the control section 321) is used. The communication section 323 (and/or the control section 321) receives, from the main body apparatus 2, sound/vibration data indicating a waveform for causing the vibration section 271 to vibrate or output a sound, and the like.

It should be noted that in another exemplary embodiment, the communication section 323 may perform wired communication, instead of wireless communication, with the main body apparatus 2. Further, the communication section 323 may have both the function of wirelessly communicating with the main body apparatus 2 and the function of performing wired communication with the main body apparatus 2.

The control section 321 is electrically connected to output means included in the spherical controller 200. In the exemplary embodiment, the spherical controller 200 includes the vibration section 271 and the light-emitting section 248 as the output means. The control section 321 controls the operation of the output means. For example, the control section 321 may reference information acquired from the input means, thereby controlling the operation of the output means in accordance with an operation on the input means. For example, in accordance with the fact that the operation surface 213 is pressed, the control section 321 may cause the vibration section 271 to vibrate or cause the light-emitting section 248 to emit light. Further, based on information received from the main body apparatus 2 via the communication section 323, the control section 321 may control the operation of the output means. That is, in accordance with a control command from the main body apparatus 2, the control section 321 may cause the vibration section 271 to vibrate or cause the light-emitting section 248 to emit light. Further, the main body apparatus 2 may transmit to the spherical controller 200 a signal indicating a waveform for causing the vibration section 271 to vibrate or output a sound, and the control section 321 may cause the vibration section 271 to vibrate or output a sound in accordance with the waveform. That is, the antenna of the communication section 323 may receive from outside (i.e., the main body apparatus 2) a signal for causing the vibration section 271 to vibrate, and the vibration section 271 may vibrate based on the signal received by the antenna. It should be noted that in the exemplary embodiment, since the vibration section 271 is a voice coil motor capable of outputting a vibration and a sound, the control section 321 can output a vibration and a sound from the vibration section 271 in accordance with the above waveform.

The control section 321 is electrically connected to a rechargeable battery 244 provided in the spherical controller 200. The control section 321 controls the supply of power from the rechargeable battery 244 to each piece of the input means, each piece of the output means, and the communication section. It should be noted that the rechargeable battery 244 may be directly connected to each piece of the input means, each piece of the output means, and the communication section. In the exemplary embodiment, based on information acquired from the button sensing section 258 (i.e., information indicating whether or not the restart button 214 is pressed), the control section 321 controls the above supply of power. Specifically, when the restart button 214 is pressed (in other words, while the restart button 214 is pressed), the control section 321 stops the supply of power from the rechargeable battery 244 to each piece of the input means, each piece of the output means, and the communication section. Further, when the restart button 214 is not pressed (in other words, while the restart button 214 is not pressed), the control section 321 supplies power from the rechargeable battery 244 to each piece of the input means, each piece of the output means, and the communication section. As described above, in the exemplary embodiment, the restart button 214 is a button for giving an instruction to restart (in other words, reset) the spherical controller 200. The restart button 214 can also be said to be a button for giving an instruction to control the on state and the off state of the power supply of the spherical controller 200.

Further, the rechargeable battery 244 is electrically connected to a charging terminal 249 provided on the outer peripheral surface of the spherical controller 200. The charging terminal 249 is a terminal for connecting to a charging device (e.g., an AC adapter or the like) (not shown). In the exemplary embodiment, the charging terminal 249 is a USB connector (more specifically, a female connector). In the exemplary embodiment, when a charging device to which mains electricity is supplied is electrically connected to the charging terminal 249, power is supplied to the rechargeable battery 244 via the charging terminal 249, thereby charging the rechargeable battery 244.

A description is given below using a game system where an operation is performed using the spherical controller 200 in a use form in which an image (and a sound) is output to the stationary monitor 6 by attaching the main body apparatus 2 alone to the cradle in the state where the left controller 3 and the right controller 4 are detached from the main body apparatus 2.

As described above, in the exemplary embodiment, the game system 1 can also be used in the state where the left controller 3 and the right controller 4 are detached from the main body apparatus 2 (referred to as a "separate state"). As a form in a case where an operation is performed on an application (e.g., a game application) using the game system 1 in the separate state, a form is possible in which one or more users each use the left controller 3 and/or the right controller 4, and a form is also possible in which one or more users each use one or more spherical controllers 200. Further, when a plurality of users perform operations using the same application, play is also possible in which a user performing an operation using the left controller 3 and/or the right controller 4 and a user performing an operation using the spherical controller 200.

With reference to FIGS. 12 to 16, a description is given of a game where the game system 1 is used. It should be noted that FIGS. 12 to 16 are diagrams showing examples of the state where a single user performs a game where the single user uses the game system 1 by operating the spherical controller 200.

For example, as shown in FIGS. 12 to 16, the user can view an image displayed on the stationary monitor 6 while performing an operation by holding the spherical controller 200 with one hand. Then, in this exemplary game, the user can perform a tilt operation or a push-in operation on the joystick 212 with their thumb and perform a push-down operation on the operation surface 213 with their index finger in the state where the user holds the controller main body portion 201 of the spherical controller 200 with one hand. That is, the user can perform both a direction input operation and a push-in operation using the joystick, and a push-down operation on the operation surface 213, using a game controller of which the outer shape is spherical. Further, in the state where the spherical controller 200 is held with one hand, the spherical controller 200 is moved in up, down, left, right, front, and back directions, rotated, or swung, whereby game play is performed in accordance with the motion or the orientation of the spherical controller 200. Then, in the above game play, the inertial sensor 247 of the spherical controller 200 can detect accelerations in the xyz-axis directions and/or angular velocities about the xyz-axis directions as operation inputs.

Further, when game play is performed by the user holding the spherical controller 200, a sound is output and a vibration is imparted from the spherical controller 200 in accordance with the situation of the game. As described above, the spherical controller 200 includes the vibration section 271 (a voice coil motor) capable of outputting a sound. The processor 81 of the main body apparatus 2 transmits sound data and/or vibration data to the spherical controller 200 in accordance with the situation of the game that is being executed by the processor 81, and thereby can output a sound and a vibration from the vibration section 271 at an amplitude and a frequency corresponding to the sound data and/or the vibration data.

FIGS. 12 to 16 show examples of game images displayed in a game played by operating the spherical controller 200. In this exemplary game, a game is performed where the actions of a player character PC and a ball object B are controlled by operating the spherical controller 200, and characters placed in a virtual space are caught. Then, an image of the virtual space indicating the game situation is displayed on the stationary monitor 6.

For example, as shown in FIG. 12, in this exemplary game, by performing a tilt operation on the joystick 212 of the spherical controller 200, it is possible to move the player character PC in the virtual space and search for a character placed in the virtual space. Then, when the player character PC encounters a character placed in the virtual space, the character is set as a catch target character HC, and a catch game where the player character PC catches the catch target character HC is started. It should be noted that a plurality of types of characters that the player character PC can encounter are set, and one of the plurality of types of characters is selected as the catch target character HC. It should be noted that the catch target character HC, the player character PC, and the like that appear in this game can also be said to be virtual objects placed in the virtual space. Further, the ball object B and the like that appear in this game function as game characters that appear in the virtual space. Further, in the exemplary embodiment, as an example of a game character as a target to be caught, the catch target character HC is used, and as an example of an object that resembles the external appearance of the game controller, the ball object B is used.

In this exemplary game, when the catch target character HC to be caught by the player character PC is set, the game shifts to a catch game mode. In the catch game mode, a game image is displayed in which an image of the virtual space where the catch target character HC is placed near the center of the virtual space is displayed on the stationary monitor 6, and the ball object B flies off toward the catch target character HC by performing the operation of throwing the spherical controller 200.

As shown in FIG. 13, in this exemplary game, as a preparation operation for performing the operation of throwing the spherical controller 200, the operation of holding up the spherical controller 200 is performed. For example, in this exemplary game, the hold-up operation is performed by performing the operation of pushing in the joystick 212 of the spherical controller 200. When the hold-up operation is performed, a catch timing image TM is displayed in the periphery of the catch target character HC displayed near the center. Here, the catch timing image TM is an image indicating to the user an appropriate catch operation timing for the catch target character HC. As an example, the size of a ring is sequentially changed, and at the timing when the size becomes a predetermined size (e.g., a minimum size), it is indicated that it is highly likely that the catch of the catch target character HC is successful by performing the operation of throwing the spherical controller 200.

Further, in this exemplary game, when the operation of holding up the spherical controller 200 is performed, then in accordance with a reproduction instruction from the main body apparatus 2, the sound of holding up the ball (e.g., the sound of gripping the ball, "creak") is emitted from the spherical controller 200. It should be noted that sound data indicating the sound of holding up the ball is written in advance in storage means (e.g., the memory 324) in the spherical controller 200, and in accordance with a reproduction instruction from the main body apparatus 2, the sound data is reproduced by the vibration section 271.

Further, in this exemplary game, the operation of holding up the spherical controller 200 is performed, whereby the ball object B representing the external appearance of the spherical controller 200 is displayed in the virtual space. In accordance with the fact that the operation of holding up the spherical controller 200 is performed, the ball object B is displayed, initially placed at a position determined in advance by an orientation determined in advance. Then, to correspond to changes in the position and/or the orientation of the spherical controller 200 in real space after the operation of holding up the spherical controller 200 is performed, the ball object B is displayed by changing the position and/or the orientation of the ball object B in the virtual space. It should be noted that the motion of the displayed ball object B does not need to completely match the position and/or the orientation of the spherical controller 200 in real space. For example, the motion of the displayed ball object B may be at a level that the motion relatively resembles the position and/or the orientation of the spherical controller 200 in the motion before and after the position and/or the orientation of the spherical controller 200 in real space change.

As shown in FIG. 14, in this exemplary game, the controller main body portion 201 of the spherical controller 200 is moved by swinging the controller main body portion 201 (e.g., swinging down the controller main body portion 201 from top to bottom), whereby the above throw operation is performed. As an example, when the magnitudes of accelerations detected by the inertial sensor 247 of the spherical controller 200 exceed a predetermined threshold, it is determined that the operation of throwing the spherical controller 200 is performed. When the throw operation is performed, the catch timing image TM is erased, and the state where the ball object B flies off toward the catch target character HC is displayed. It should be noted that the trajectory of the ball object B moving in the virtual space may be a trajectory determined in advance from the position of the ball object B displayed at the time when the throw operation is performed to the placement position of the catch target character HC, or the trajectory may change in accordance with the content of the throw operation (e.g., the magnitudes of accelerations generated in the spherical controller 200).

Further, in this exemplary game, in accordance with the fact that the operation of throwing the spherical controller 200 is performed, the main body apparatus 2 determines the success or failure of the catch of the catch target character HC. For example, based on the timing when the operation of throwing the spherical controller 200 is performed (e.g., the size of the catch timing image TM at the time when the throw operation is performed), the content of the throw operation (e.g., the magnitudes of accelerations generated in the spherical controller 200), the level of difficulty of the catch of the catch target character HC, the empirical value of the player character PC, the number of catch tries, and the like, the main body apparatus 2 determines the success or failure of the catch of the catch target character HC.

Further, in this exemplary game, when the operation of throwing the spherical controller 200 is performed, then in accordance with a reproduction instruction from the main body apparatus 2, the sound of the ball flying off (e.g., the sound of the ball flying off, "whiz") is emitted from the spherical controller 200. It should be noted that sound data indicating the sound of the ball flying off is written in advance in the storage means (e.g., the memory 324) in the spherical controller 200, and in accordance with a reproduction instruction from the main body apparatus 2, the sound data is reproduced by the vibration section 271.

Further, in this exemplary game, when the operation of throwing the spherical controller 200 is performed, the spherical controller 200 vibrates in accordance with a reproduction instruction from the main body apparatus 2. It should be noted that vibration data for causing the spherical controller 200 to vibrate is written in advance in the storage means (e.g., the memory 324) in the spherical controller 200 with the sound data indicating the sound of the ball flying off, and in accordance with a reproduction instruction from the main body apparatus 2, the vibration data is reproduced by the vibration section 271. Here, the sound data written in the storage means in the spherical controller 200 together with the vibration data includes a sound signal having a frequency in the audible range for causing the vibration section 271 to output the sound of the ball flying off, and also includes a vibration signal having a frequency outside the audible range for causing the vibration section 271 to perform a vibration corresponding to the throw operation. A sound/vibration signal including both the sound signal and the vibration signal is input to the vibration section 271, whereby the above sound and the above vibration are simultaneously emitted from the vibration section 271.

It should be noted that in the exemplary embodiment, regarding a signal (a waveform) to be reproduced by the vibration section 271, even a signal in the purpose of outputting a sound having a frequency in the audible range for outputting a sound, the vibration section 271 can output a sound in accordance with the signal, thereby imparting a weak vibration to the controller main body portion 201 of the spherical controller 200. Further, in the exemplary embodiment, regarding a signal (a waveform) to be reproduced by the vibration section 271, even a signal in the purpose of outputting a vibration having a frequency outside the audible range for performing a vibration, the vibration section 271 can vibrate in accordance with the signal, whereby a small sound may be emitted from the spherical controller 200. That is, even when a signal including one of the above sound signal and the above vibration signal is input to the vibration section 271, a sound and a vibration can be simultaneously emitted from the vibration section 271.

As shown in FIG. 15, in this exemplary game, after the state where the ball object B flies off toward the catch target character HC is displayed on the stationary monitor 6, a game image I indicating the state where the ball object B hits the catch target character HC is displayed. For example, in the example of FIG. 15, "Nice!" indicating that the ball object B hits the catch target character HC in a favorable state is displayed as a game image I. It should be noted that the state where the ball object B hits the catch target character HC may be set by the main body apparatus 2 based on the success or failure of the catch of the catch target character HC, or may be set by the main body apparatus 2 based on the content of the operation of throwing the spherical controller 200. Further, the state where the ball object B does not hit the catch target character HC may be displayed. For example, in accordance with the strength of the operation of throwing the spherical controller 200 (e.g., the relative magnitudes of accelerations generated in the spherical controller 200), an image may be displayed in which the ball object B stops moving on the near side of the catch target character HC, or the ball object B flies off beyond the catch target character HC.

Further, in this exemplary game, when the ball object B hits the catch target character HC, then in accordance with a reproduction instruction from the main body apparatus 2, the sound of the ball hitting the catch target character HC (e.g., the sound of the ball hitting a character, "crash!") is emitted from the spherical controller 200. It should be noted that sound data indicating the sound of the ball hitting the character is also written in advance in the storage means (e.g., the memory 324) in the spherical controller 200, and in accordance with a reproduction instruction from the main body apparatus 2, the sound data is reproduced by the vibration section 271.

Further, in this exemplary game, various representations may be performed during the period until the user is notified of the success or failure of the catch of the catch target character HC. For example, in this exemplary game, a representation that after the ball object B hits the catch target character HC, the catch target character HC enters the ball object B, a representation that after the catch target character HC enters the ball object B, the ball object B closes, a representation that the ball object B that the catch target character HC has entered falls to the ground in the virtual space, a representation that the ball object B that the catch target character HC has entered intermittently shakes multiple times on the ground in the virtual space, and the like may be performed. Further, in this exemplary game, when each of the above representations is performed, then in accordance with a reproduction instruction from the main body apparatus 2, a sound corresponding to the representation may be emitted from the spherical controller 200. It should be noted that sound data indicating the sounds corresponding to these representations is also written in advance in the storage means (e.g., the memory 324) in the spherical controller 200, and in accordance with a reproduction instruction from the main body apparatus 2, the sound data is reproduced by the vibration section 271. Further, in this exemplary game, when each of the above representations is performed, the state where a light-emitting part C as a part of the ball object B lights up or blinks in a predetermined color may be displayed on the stationary monitor 6, and in accordance with a reproduction instruction from the main body apparatus 2, light corresponding to the representation may also be output from the spherical controller 200. It should be noted that light emission color data indicating the beams of light corresponding to these representations is written in advance in the storage means (e.g., the memory 324) in the spherical controller 200, and in accordance with a reproduction instruction from the main body apparatus 2, the light-emitting section 248 emits light in a color indicated by the light emission color data.

It should be noted that in the representation that the ball object B that the catch target character HC has entered intermittently shakes multiple times on the ground in the virtual space, a reproduction instruction is intermittently given multiple times by the main body apparatus 2, and in accordance with the reproduction instruction, the sound of the ball shaking is emitted from the spherical controller 200, and the spherical controller 200 also vibrates. It should be noted that sound data indicating the sound of the ball shaking and the vibration of the ball shaking is also written in advance in the storage means (e.g., the memory 324) in the spherical controller 200, and in accordance with a reproduction instruction from the main body apparatus 2, the sound data is reproduced by the vibration section 271. Here, the sound data written in the storage means in the spherical controller 200 includes a sound signal having a frequency in the audible range for causing the vibration section 271 to output the sound of the ball shaking, and also includes a vibration signal having a frequency outside the audible range for causing the vibration section 271 to perform a vibration for shaking. The sound signal and the vibration signal are simultaneously input to the vibration section 271, whereby the above sound and the above vibration are simultaneously emitted from the vibration section 271.

As shown in FIG. 16, in this exemplary game, through the above representations, an image notifying the user of the success or failure of the catch of the catch target character HC is displayed on the stationary monitor 6. As a first stage where the user is notified of the success of the catch of the catch target character HC, a game image indicating that the catch is successful, and the state where the light-emitting part C as a part of the ball object B lights up or blinks in a color indicating that the catch is successful (e.g., green) are displayed on the stationary monitor 6. Further, at the first stage where the user is notified of the success of the catch of the catch target character HC, then in accordance with a reproduction instruction from the main body apparatus 2, a sound indicating that the catch is successful is emitted from the spherical controller 200, and the spherical controller 200 also emits light in a color indicating that the catch is successful (e.g., green). As an example, at the first stage where the user is notified of the success of the catch of the catch target character HC, then in accordance with a reproduction instruction from the main body apparatus 2, a sound indicating that the catch is successful (e.g., a sound indicating that the catch is successful, "click!") is output from the vibration section 271 of the spherical controller 200. Further, at the first stage where the user is notified of the success of the catch of the catch target character HC, then in accordance with a reproduction instruction from the main body apparatus 2, the light-emitting section 248 lights up or blinks in a color indicating that the catch is successful (e.g., green), whereby light in this color is emitted from the opening 211a of the spherical controller 200. It should be noted that sound data indicating the sound to be output at the first stage where the user is notified of the success of the catch of the catch target character HC, and light emission color data indicating the light to be emitted at the first stage are also written in advance in the storage means (e.g., the memory 324) in the spherical controller 200. In accordance with a reproduction instruction from the main body apparatus 2, the sound data is reproduced by the vibration section 271, and in accordance with a reproduction instruction from the main body apparatus 2, the light-emitting section 248 emits light in a color indicated by the light emission color data.

At a second stage where the user is notified of the success of the catch of the catch target character HC and which is after a predetermined time elapses from the first stage, the state where the light-emitting part C of the ball object B lights up or blinks in a color corresponding to the catch target character HC of which the catch is successful is displayed on the stationary monitor 6. For example, the color corresponding to the catch target character HC may be a color related to the base color of the catch target character HC. For example, in the case of a character of which the whole body has a yellow base color, the color corresponding to the catch target character HC may be yellow. Further, at the second stage where the user is notified of the success of the catch of the catch target character HC, then in accordance with a reproduction instruction from the main body apparatus 2, the cry of the catch target character HC of which the catch is successful is emitted from the spherical controller 200, and the spherical controller 200 also emits light in the color corresponding to the caught catch target character HC. As an example, at the second stage where the user is notified of the success of the catch of the catch target character HC, then in accordance with a reproduction instruction from the main body apparatus 2, the cry of the catch target character HC of which the catch is successful (e.g., the cry of the catch target character HC, "gar") is output from the vibration section 271 of the spherical controller 200. Further, at the second stage where the user is notified of the success of the catch of the catch target character HC, then in accordance with a reproduction instruction from the main body apparatus 2, the light-emitting section 248 lights up or blinks in the color corresponding to the catch target character HC of which the catch is successful, whereby light in this color is emitted from the opening 211a of the spherical controller 200. It should be noted that as will be described later as catch target reproduction data, sound data indicating the sound to be output at the second stage where the user is notified of the success of the catch of the catch target character HC and light emission color data indicating the light to be emitted at the second stage are transmitted from the main body apparatus 2 to the spherical controller 200 and written in the storage means (e.g., the memory 324) in the spherical controller 200 when the catch target character HC is set. In accordance with a reproduction instruction from the main body apparatus 2, the sound data is reproduced by the vibration section 271, and in accordance with a reproduction instruction from the main body apparatus 2, the light-emitting section 248 emits light in a color indicated by the light emission color data.

It should be noted that the sound corresponding to the catch target character HC to be output from the spherical controller 200 is typically the cry of the catch target character HC. Here, the cry of the catch target character HC may be substantially the same as the cry emitted from the catch target character HC in a game where the catch target character HC appears. Specifically, when an image of the virtual space indicating the game situation where the catch target character HC appears is displayed on the stationary monitor 6, substantially the same cry as the cry of the catch target character HC output from a speaker of the stationary monitor 6 in accordance with the game situation is output from the vibration section 271 of the spherical controller 200.

Further, in the exemplary embodiment, regarding the light emission of the spherical controller 200 corresponding to the caught catch target character HC, the spherical controller 200 lights up or blinks in a single color corresponding to a base color. In another exemplary embodiment, regarding the light emission of the spherical controller 200 corresponding to the caught catch target character HC, the spherical controller 200 may light up or blink in light obtained by combining a plurality of colors. Further, in another exemplary embodiment, the light emission of the spherical controller 200 corresponding to the caught catch target character HC may be a light emission pattern that sequentially changes to a plurality of different colors. As an example, when the caught catch target character HC has a plurality of base colors, the spherical controller 200 may light up or blink in a hue obtained by combining the plurality of base colors, or may emit light in a light emission pattern that sequentially changes to the plurality of base colors. It should be noted that in the exemplary embodiment, as an example of a light-emitting section controlled by light emission control means, the light-emitting section 248 is used. Alternatively, the light emission control means may cause the light-emitting section (the light-emitting section 248) to emit light in a light emission pattern corresponding to in a caught game character (the catch target character HC) based on second data (a reproduction instruction) from the game apparatus (the main body apparatus 2). Further, the light emission pattern controlled by the light emission control means may be a light emission pattern based on monochromatic light, or may be a light emission pattern that sequentially changes to beams of light of different colors.

Figure 17:
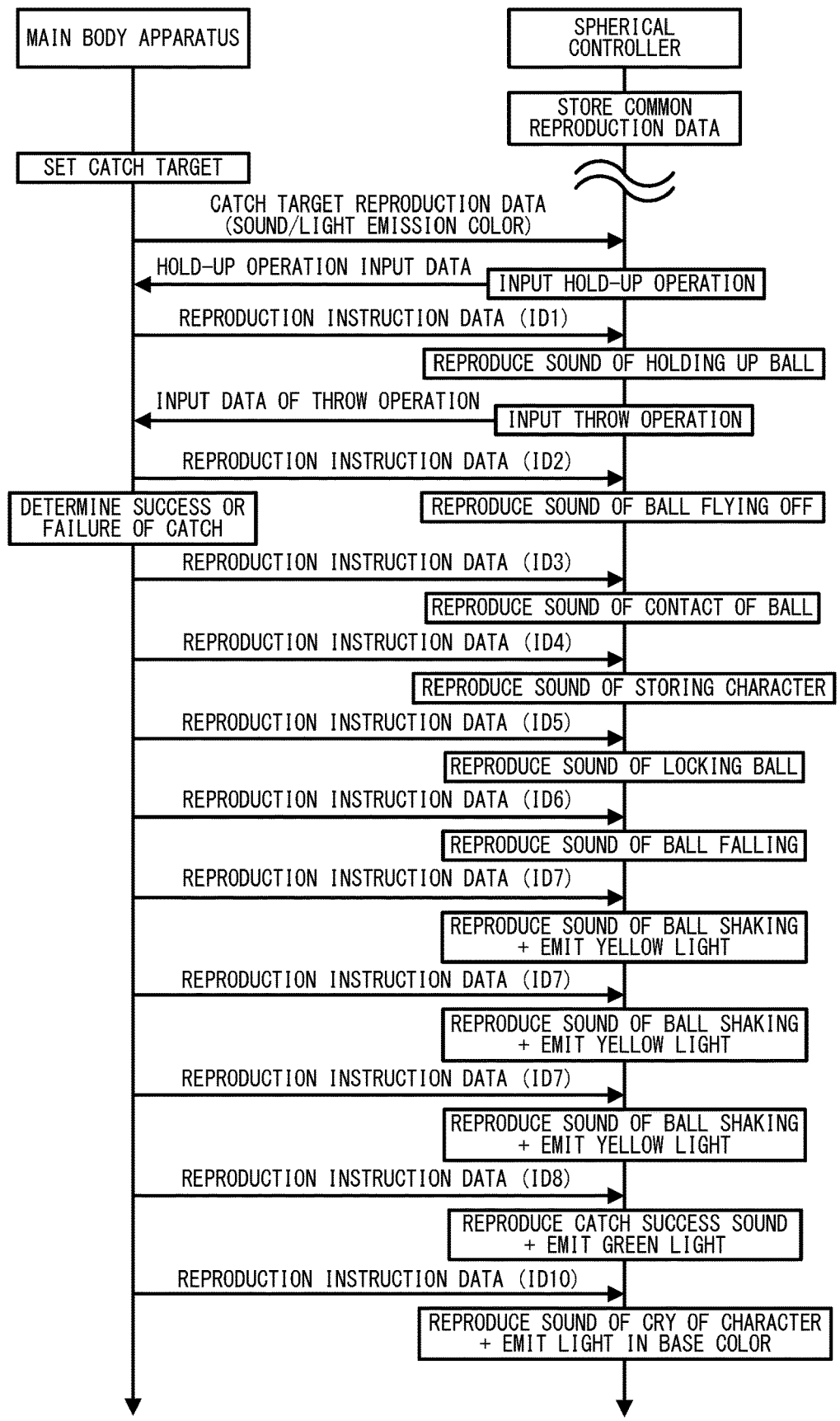
FIG. 17 is a diagram showing a non-limiting example of communication data transmitted and received between the main body apparatus 2 and the spherical controller 200.

Next, with reference to FIG. 17, a description is given of communication data transmitted and received between the main body apparatus 2 and the spherical controller 200 in the above game. It should be noted that FIG. 17 is a diagram showing an example of the communication data transmitted and received between the main body apparatus 2 and the spherical controller 200 when the game where the game system 1 is used is performed.

In FIG. 17, common reproduction data is written in advance in the storage means (e.g., the memory 324) in the spherical controller 200. Here, the common reproduction data is information indicating a sound and/or light to be commonly output regardless of the type of the catch target character HC, and is data for outputting a sound and light used in the representations other than those at the second stage where the user is notified of the success of the catch of the catch target character HC. Specifically, the common reproduction data includes sound/vibration data indicating a sound to be output from the vibration section 271 in the above representations, and light emission color data indicating a color in which the light-emitting section 248 is caused to emit light. A sound and a light emission color to be output in response to a reproduction instruction from the main body apparatus 2 (e.g., reproduction instruction data ID1 to ID10 indicating a reproduction code) is specified. It should be noted that the timing when the common reproduction data is written in advance may be any time during the period before the catch target character HC is set. The common reproduction data may be written to the above storage means at the time when the spherical controller 200 is manufactured, or may be written to the above storage means at the time when an application in the spherical controller 200 is updated, or may be written to the above storage means at the time when the game application is installed on the main body apparatus 2.

When the user searches for a character using the player character PC, and a catch target character HC as a catch target is selected from among a plurality of types of characters and set, sound data and light emission color data corresponding to the type of the catch target character HC is transmitted from the main body apparatus 2 to the spherical controller 200 as catch target reproduction data. Then, the catch target reproduction data is received by the spherical controller 200 and written to a rewriting area in the memory 324. It should be noted that in the exemplary embodiment, as an example of second data corresponding to a game character as a target to be caught, catch target reproduction data is used.

The catch target reproduction data to be transmitted to the spherical controller 200 is generated in the main body apparatus 2. Alternatively, the catch target reproduction data may be generated by being extracted from a data group stored in advance in the main body apparatus 2. Yet alternatively, every time a catch target character HC as a catch target is selected, the catch target reproduction data may be newly generated using a parameter related to the catch target character HC.

Yet alternatively, depending on the type of the catch target character HC as a catch target, the catch target reproduction data may be written in advance in the storage means (e.g., the memory 324) in the spherical controller 200. For example, it is possible that regarding a catch target character HC frequently set as a catch target, the catch target reproduction data is written in advance in the storage means (e.g., the memory 324) in the spherical controller 200, similarly to the common reproduction data. In this case, data transmitted from the main body apparatus 2 to the spherical controller 200 when a catch target character HC as a catch target is selected from among a plurality of types of characters and set may be identification information for identifying the catch target character HC, instead of the catch target reproduction data. When the spherical controller 200 receives the identification information for identifying the catch target character HC from the main body apparatus 2, the spherical controller 200 extracts data (sound data and light emission color data) corresponding to the identification information from catch target reproduction data written in advance in the storage means and sets the data.

Next, when the user performs a hold-up operation using the spherical controller 200 (see FIG. 13), operation data corresponding to the hold-up operation is transmitted from the spherical controller 200 to the main body apparatus 2. In accordance with the reception of the operation data corresponding to the hold-up operation, the main body apparatus 2 displays on the stationary monitor 6 a game image corresponding to the operation and also transmits to the spherical controller 200 the reproduction instruction data ID1 for causing the spherical controller 200 to output the sound of holding up the ball. Then, in accordance with the reception of the reproduction instruction data ID1, the spherical controller 200 extracts sound data corresponding to the reproduction instruction data ID1 from the common reproduction data and causes the vibration section 271 to output a sound corresponding to the sound data (the sound of holding up the ball). Here, the reproduction instruction data to be transmitted from the main body apparatus 2 may indicate the codes of a sound to be output from the spherical controller 200 and a light emission color in which light is to be emitted. In this case, sound data and light emission color data corresponding to the codes are managed in the storage means (e.g., the memory 324) in the spherical controller 200. It should be noted that catch target reproduction data written in the rewriting area in the memory 324 is also managed corresponding to a code indicated by the reproduction instruction data transmitted from the main body apparatus 2.

Next, when the user performs a throw operation using the spherical controller 200 (see FIG. 14), operation data corresponding to the throw operation is transmitted from the spherical controller 200 to the main body apparatus 2. In accordance with the reception of the operation data corresponding to the throw operation, the main body apparatus 2 displays on the stationary monitor 6 a game image corresponding to the operation and also transmits to the spherical controller 200 the reproduction instruction data ID2 for causing the spherical controller 200 to output the sound of the ball flying off and a vibration. Then, in accordance with the reception of the reproduction instruction data ID2, the spherical controller 200 extracts sound data corresponding to the reproduction instruction data ID2 from the common reproduction data and causes the vibration section 271 to output a sound corresponding to the sound data (the sound of the ball flying off) and a vibration (a vibration corresponding to the throw operation). It should be noted that the sound data corresponding to the reproduction instruction data ID2 includes a sound signal having a frequency in the audible range for causing the vibration section 271 to output the sound of the ball flying off, and also includes a vibration signal having a frequency outside the audible range for causing the vibration section 271 to perform a vibration corresponding to the throw operation. The sound signal and the vibration signal are simultaneously input to the vibration section 271, whereby the above sound and the above vibration are simultaneously emitted from the vibration section 271. It should be noted that in the exemplary embodiment, as an example of first data to be transmitted from a game controller, operation data corresponding to a throw operation is used.

On the other hand, based on the content of the throw operation performed using the spherical controller 200 by the user, the main body apparatus 2 performs the process of determining the success or failure of the catch of the set catch target character HC. Then, after transmitting the reproduction instruction data ID2, the main body apparatus 2 displays on the stationary monitor 6 a game image in which the ball object B hits the catch target character HC in the virtual space, and also transmits to the spherical controller 200 the reproduction instruction data ID3 for causing the spherical controller 200 to output the sound of the ball coming into contact with the catch target character HC. Then, in accordance with the reception of the reproduction instruction data ID3, the spherical controller 200 extracts sound data corresponding to the reproduction instruction data ID3 from the common reproduction data and causes the vibration section 271 to output a sound corresponding to the sound data (the sound of the contact of the ball).

Next, after transmitting the reproduction instruction data ID3, the main body apparatus 2 displays on the stationary monitor 6 a game image in which the catch target character HC is stored in the ball object B in the virtual space, and also transmits to the spherical controller 200 the reproduction instruction data ID4 for causing the spherical controller 200 to output the sound of storing the catch target character HC in the ball. Then, in accordance with the reception of the reproduction instruction data ID4, the spherical controller 200 extracts sound data corresponding to the reproduction instruction data ID4 from the common reproduction data and causes the vibration section 271 to output a sound corresponding to the sound data (the sound of storing the catch target character HC in the ball).

Next, after transmitting the reproduction instruction data ID4, the main body apparatus 2 displays on the stationary monitor 6 a game image in which the ball object B is locked in the virtual space, and also transmits to the spherical controller 200 the reproduction instruction data ID5 for causing the spherical controller 200 to output the sound of locking the ball. Then, in accordance with the reception of the reproduction instruction data ID5, the spherical controller 200 extracts sound data corresponding to the reproduction instruction data ID5 from the common reproduction data and causes the vibration section 271 to output a sound corresponding to the sound data (the sound of locking the ball).

Next, after transmitting the reproduction instruction data ID5, the main body apparatus 2 displays on the stationary monitor 6 a game image in which the ball object B falls to the ground in the virtual space, and also transmits to the spherical controller 200 the reproduction instruction data ID6 for causing the spherical controller 200 to output the sound of the ball falling. Then, in accordance with the reception of the reproduction instruction data ID6, the spherical controller 200 extracts sound data corresponding to the reproduction instruction data ID6 from the common reproduction data and causes the vibration section 271 to output a sound corresponding to the sound data (the sound of the ball falling).

Next, after transmitting the reproduction instruction data ID6, the main body apparatus 2 displays on the stationary monitor 6 a game image in which the light-emitting part C lights up or blinks in a predetermined color (e.g., yellow) while the ball object B shakes multiple times on the ground in the virtual space, also causes the spherical controller 200 to output the sound of the ball shaking multiple times and a vibration, and transmits the reproduction instruction data ID7 for causing the spherical controller 200 to emit light in the predetermined color to the spherical controller 200 multiple times in accordance with the timing when the ball object B shakes. Then, every time the spherical controller 200 receives the reproduction instruction data ID7, the spherical controller 200 extracts sound data corresponding to the reproduction instruction data ID7 from the common reproduction data and causes the vibration section 271 to output a sound corresponding to the sound data (the sound of the ball shaking) and a vibration (the vibration of the ball shaking). Further, every time the spherical controller 200 receives the reproduction instruction data ID7, the spherical controller 200 extracts light emission color data corresponding to the reproduction instruction data ID7 from the common reproduction data and causes the light-emitting section 248 to emit light in a color corresponding to the light emission color data (e.g., yellow). It should be noted that the sound data corresponding to the reproduction instruction data ID7 includes a sound signal having a frequency in the audible range for causing the vibration section 271 to output the sound of the ball shaking, and also includes a vibration signal having a frequency outside the audible range for causing the vibration section 271 to perform a shaking vibration. The sound signal and the vibration signal are simultaneously input to the vibration section 271, whereby the above sound and the above vibration are simultaneously emitted from the vibration section 271.

Next, after transmitting the reproduction instruction data ID7 multiple times, the main body apparatus 2 displays on the stationary monitor 6 a game image indicating that the catch by the ball object B is successful in the virtual space, also causes the spherical controller 200 to output a sound indicating that the catch is successful, and transmits to the spherical controller 200 the reproduction instruction data ID8 for causing the spherical controller 200 to emit light in a color indicating that the catch is successful (e.g., green). Then, in accordance with the reception of the reproduction instruction data ID8, the spherical controller 200 extracts sound data corresponding to the reproduction instruction data ID8 from the common reproduction data and causes the vibration section 271 to output a sound corresponding to the sound data (a catch success sound). Further, in accordance with the reception of the reproduction instruction data ID8, the spherical controller 200 extracts light emission color data corresponding to the reproduction instruction data ID8 from the common reproduction data and causes the light-emitting section 248 to emit light in a color corresponding to the light emission color data (e.g., green). It should be noted that in the exemplary embodiment, as an example of data indicating the result of the determination of the success or failure of the catch of a game character, the reproduction instruction data ID8 is used.

Next, after transmitting the reproduction instruction data ID8, the main body apparatus 2 displays on the stationary monitor 6 a game image indicating the state where the catch target character HC is caught in the ball object B in the virtual space, also causes the spherical controller 200 to output a sound corresponding to the caught catch target character HC (e.g., the cry), and transmits to the spherical controller 200 the reproduction instruction data ID10 for causing the spherical controller 200 to emit light in a color corresponding to the caught catch target character HC (e.g., the base color of the caught catch target character HC). Then, in accordance with the reception of the reproduction instruction data ID10, the spherical controller 200 extracts sound data corresponding to the reproduction instruction data ID10 from the catch target reproduction data and causes the vibration section 271 to output a sound corresponding to the sound data (the cry of the catch target character HC). Further, in accordance with the reception of the reproduction instruction data ID10, the spherical controller 200 extracts light emission color data corresponding to the reproduction instruction data ID10 from the catch target reproduction data and causes the light-emitting section 248 to emit light in a color corresponding to the light emission color data (e.g., the base color of the catch target character HC). It should be noted that in the exemplary embodiment, as an example of third data for outputting a sound corresponding to a game character and fourth data for causing a light-emitting section to emit light in a color corresponding to the game character, the reproduction instruction data ID10 is used.

Here, in the catch target reproduction data stored in the spherical controller 200, a set of sound data and light emission color data corresponding to the set type of the catch target character HC is stored. In this case, as an example, the reproduction instruction data ID10 may be a command to reproduce the set of sound data and light emission color data. Such a command to reproduce the set of sound data and light emission color data is a single piece of data that can be said to be third data for outputting a sound corresponding to a game character and also fourth data for causing a light-emitting section to emit light in a color corresponding to the game character (i.e., the third data and the fourth data are collected treated as a single piece of data). Further, as another example, in the reproduction instruction data ID10, a command to reproduce the sound data and a command to reproduce the light emission color data may be separately configured. When the command to reproduce the sound data and the command to reproduce the light emission color data are thus separately configured, third data for outputting a sound corresponding to a game character and fourth data for causing a light-emitting section to emit light in a color corresponding to the game character can be said to be different pieces of data.

It should be noted that when the catch by the ball object B is failed, the main body apparatus 2 transmits to the spherical controller 200 the reproduction instruction data ID9 instead of the reproduction instruction data ID8 and does not transmit the reproduction instruction data ID10, either. That is, when the catch by the ball object B is failed, and after the main body apparatus 2 transmits the reproduction instruction data ID7 multiple times, the main body apparatus 2 displays on the stationary monitor 6 a game image indicating that the catch by the ball object B is failed in the virtual space, also causes the spherical controller 200 to output a sound indicating that the catch is failed, and transmits to the spherical controller 200 the reproduction instruction data ID9 for causing the spherical controller 200 to emit light in a color indicating that the catch is failed (e.g., red). Then, in accordance with the reception of the reproduction instruction data ID9, the spherical controller 200 extracts sound data corresponding to the reproduction instruction data ID9 from the common reproduction data and causes the vibration section 271 to output a sound corresponding to the sound data (a catch failure sound). Further, in accordance with the reception of the reproduction instruction data ID9, the spherical controller 200 extracts light emission color data corresponding to the reproduction instruction data ID9 from the common reproduction data and causes the light-emitting section 248 to emit light in a color corresponding to the light emission color data (e.g., red). It should be noted that in the exemplary embodiment, as another example of the data indicating the result of the determination of the success or failure of the catch of the game character, the reproduction instruction data ID9 is used.

Further, when the catch by the ball object B is failed, at least one of the representations in which the reproduction instruction data ID3 to ID7 is transmitted may not be performed. As an example, when the catch by the ball object B is failed, and after the representation that the ball object B flies off, in which reproduction instruction data ID2 is transmitted, is performed, a game image indicating that the catch by the ball object B is failed may be displayed on the stationary monitor 6 by displaying a game image in which the ball object B does not hit the catch target character HC, and the reproduction instruction data ID9 may also be transmitted to the spherical controller 200.

Further, in another exemplary embodiment, even when the catch by the ball object B is successful, and after the representation that the ball object B flies off, in which the reproduction instruction data ID2 is transmitted, is performed, a representation using a game image in which the ball object B does not hit the catch target character HC may be performed. In this case, as an example, after the representation that the ball object B flies off, in which the reproduction instruction data ID2 is transmitted, is performed, a representation that the ball object B falls to the ground, in which the reproduction instruction data ID6 is transmitted, may be performed, and a representation that the catch is successful may be continued.

Further, in the exemplary embodiment, in accordance with the fact that the catch target character HC as the catch target is selected and set, the type of catch target reproduction data corresponding to the catch target character HC is transmitted from the main body apparatus 2 to the spherical controller 200. Consequently, it is possible to prevent the reception of the catch target reproduction data to be used when the catch is successful from being delayed. Alternatively, as another exemplary embodiment, at a timing included in the period from when the catch target character HC as the catch target is selected and set to the time when it is determined that the catch is successful, the type of catch target reproduction data corresponding to the catch target character HC may be transmitted from the main body apparatus 2 to the spherical controller 200. As an example, simultaneously with the reproduction instruction data ID8 to be transmitted to the spherical controller 200, the catch target reproduction data (sound data and light emission color data) corresponding to the catch target character HC of which the catch is successful may be transmitted from the main body apparatus 2 to the spherical controller 200. In this case, the catch target reproduction data corresponding to the catch target character HC is transmitted at the timing when it is determined that the catch is successful. Yet alternatively, as another exemplary embodiment, at a timing after it is determined that the catch of the catch target character HC as the catch target is successful, the catch target reproduction data corresponding to the catch target character HC of which the catch is successful may be transmitted from the main body apparatus 2 to the spherical controller 200. As an example, during the period from when the reproduction instruction data ID8 is transmitted to the spherical controller 200 to when the reproduction instruction data ID10 is transmitted, or simultaneously with the reproduction instruction data ID10 transmitted to the spherical controller 200, the catch target reproduction data (sound data and light emission color data) corresponding to the catch target character HC of which the catch is successful may be transmitted from the main body apparatus 2 to the spherical controller 200. Further, the sound data and the light emission color data corresponding to the type of the catch target character HC may be transmitted from the main body apparatus 2 to the spherical controller 200 at different timings, or either one of the sound data and the light emission color data may be written in advance in the storage means (e.g., the memory 324) of the spherical controller 200.

As described above, in the game system 1 where the spherical controller 200 according to the exemplary embodiment is used, by operating the spherical controller 200, a sound corresponding to the catch target character HC of which the catch is successful is output from the spherical controller 200. Thus, it is possible to increase a realistic feeling in a game where the catch target character HC is caught.

Further, the catch target reproduction data to be written to the spherical controller 200 according to the exemplary embodiment during the catch game may be erased at the time when the catch game ends, or may be rewritten as new catch target reproduction data at the time when a new catch target is set. Consequently, even when many catch target candidates are set, catch target reproduction data of one of the catch target candidates is merely written to the spherical controller 200, whereby it is possible to achieve the above representations. Thus, even when the storage capacity of the spherical controller 200 is small, it is possible to achieve the above representations. On the other hand, the common reproduction data written in advance in the spherical controller 200 according to the exemplary embodiment is data to be commonly used, regardless of the type of the catch target. Thus, the common reproduction data continues to be maintained in the spherical controller 200 even when the catch game ends. Consequently, it is possible to make the amount of data to be transmitted from the main body apparatus 2 to the spherical controller 200 in the catch game small, and it is also possible to solve a problem due to the delay in the transmission and reception of data.

Figure 18:
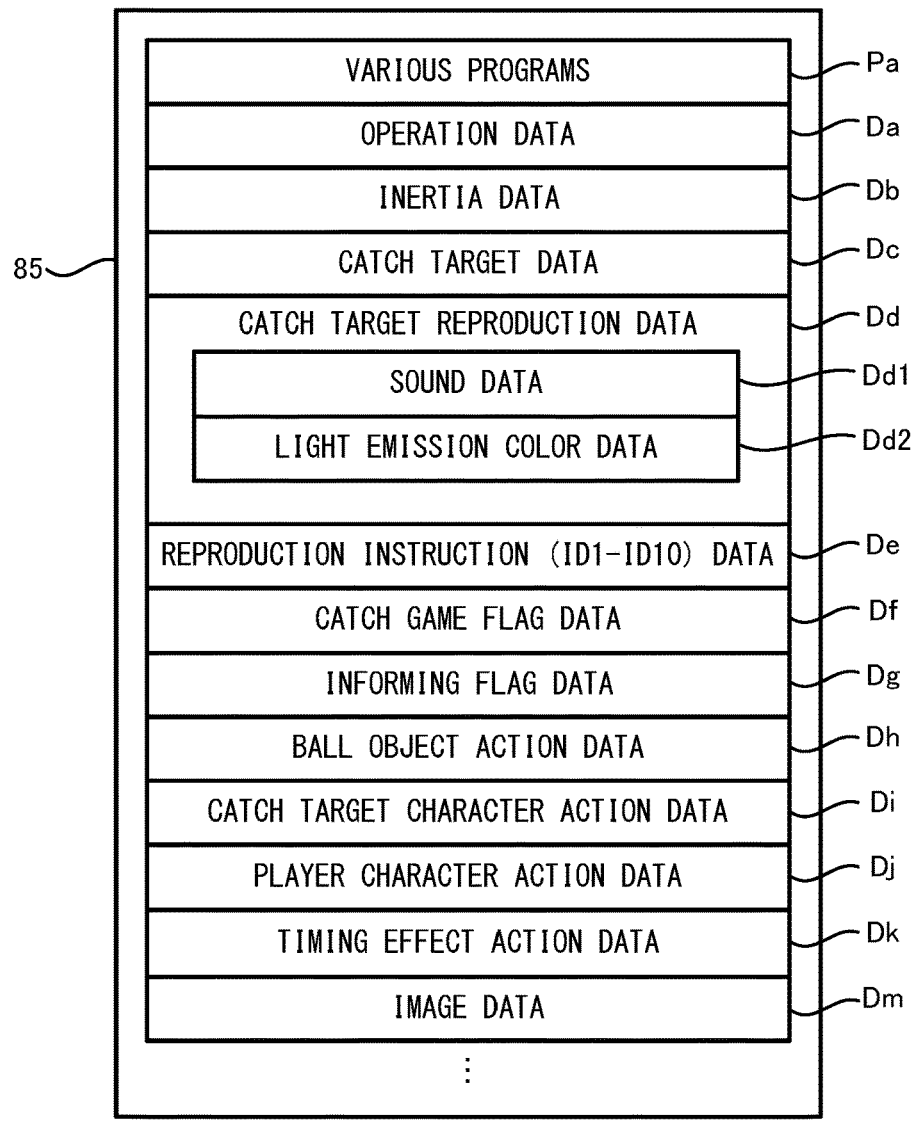
FIG. 18 is a diagram showing a non-limiting example of a data area of a DRAM 85 of the main body apparatus 2 in the exemplary embodiment.
Figure 19:
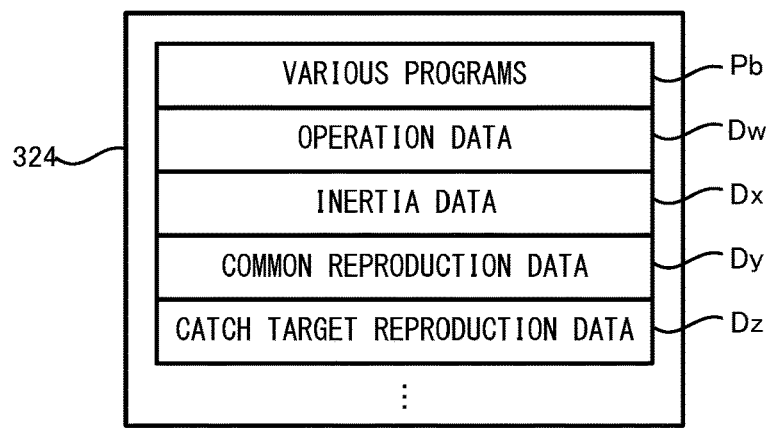
FIG. 19 is a diagram showing a non-limiting example of a data area set in a memory 324 of the spherical controller 200 in the exemplary embodiment.

Next, with reference to FIGS. 18 to 22, a description is given of an example of a specific process executed by the game system 1 in the exemplary embodiment. FIG. 18 is a diagram showing an example of a data area set in the DRAM 85 of the main body apparatus 2 in the exemplary embodiment. Further, FIG. 19 is a diagram showing an example of a data area set in the memory 324 of the spherical controller 200 according to the exemplary embodiment. It should be noted that in the DRAM 85 and the memory 324, in addition to the data shown in FIGS. 18 and 19, data used in another process is also stored, but is not described in detail here.

In a program storage area of the DRAM 85, various programs Pa, which are executed by the game system 1, are stored. In the exemplary embodiment, as the various programs Pa, a communication program for wirelessly communicating with the spherical controller 200, an application program for performing information processing (e.g., game processing) based on data acquired from the spherical controller 200, and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process and information processing executed by the game system 1 is stored. In the exemplary embodiment, in the DRAM 85, operation data Da, inertia data Db, catch target data Dc, catch target reproduction data Dd, reproduction instruction data De, catch game flag data Df, informing flag data Dg, ball object action data Dh, catch target character action data Di, player character action data Dj, timing effect action data Dk, image data Dm, and the like are stored.

The operation data Da is operation data appropriately acquired from the spherical controller 200. As described above, operation data transmitted from the spherical controller 200 includes information regarding an input (specifically, information regarding an operation or the detection result of the inertial sensor 247) from each of the input sections (specifically, the joystick 212, the button sensing section 258, and the sensing circuit 322). In the exemplary embodiment, operation data is transmitted in a predetermined cycle from the spherical controller 200 through wireless communication, and the operation data Da is appropriately updated using the received operation data. It should be noted that the update cycle of the operation data Da may be such that the operation data Da is updated every frame, which is the cycle of the processing described later executed by the main body apparatus 2, or is updated every cycle in which the above operation data is transmitted through the wireless communication.

The inertia data Db is data indicating accelerations and/or angular velocities generated in the spherical controller 200. For example, the inertia data Db includes data indicating accelerations generated in the xyz axis directions, except for the gravitational acceleration generated in the spherical controller 200, data indicating angular velocities about the xyz axes generated in the spherical controller 200, and/or the like.

The catch target data Dc is data indicating a catch target (the catch target character HC) set in a catch game.

The catch target reproduction data Dd includes sound data Dd1, light emission color data Dd2, and the like. The sound data Dd1 is data indicating a sound to be output from the vibration section 271, corresponding to the catch target (the catch target character HC) set in the catch game, and is, for example, data indicating the cry of the catch target character HC caught in the ball object B. The light emission color data Dd2 is data indicating a color in which the light-emitting section 248 is caused to emit light corresponding to the catch target (the catch target character HC) set in the catch game.

The reproduction instruction data De is data for instructing the spherical controller 200 to emit a sound and/or light, and for example, includes the reproduction instruction data ID1 to ID10 indicated in accordance with the game situation.

The catch flag data Df is data indicating a catch flag that is set to on when the catch game is performed. The informing flag data Dg is data indicating an informing flag that is set to on during the period from when a throw operation is performed to when the user is informed of the success or failure of the catch.

The ball object action data Dh is data indicating the position, the orientation, the action, and the like of the ball object B in the virtual space. The catch target character action data Di is data indicating the position, the orientation, the action, and the like of the catch target character HC in the virtual space. The player character action data Dj is data indicating of the position, the direction, the orientation, the action, and the like of the player character PC in the virtual space. The timing effect action data Dk is data indicating the position, the size, the action, and the like of the catch timing image TM.

The image data Dm is data for displaying images (e.g., an image of the player character PC, an image of the catch target character HC, an image of the ball object B, an image of another virtual object, a field image, a background image, and the like) on the display 12 of the main body apparatus 2 or a display screen of the stationary monitor 6 when a game is performed.

In a program storage area of the memory 324, various programs Pb to be executed by the spherical controller 200 are stored. In the exemplary embodiment, as the various programs Pb, a communication program for wirelessly communicating with the main body apparatus 2, an application program for performing a process based on reproduction instruction data acquired from the main body apparatus 2, and the like are stored. It should be noted that the various programs Pb may be stored in advance in the memory 324, or may be acquired from the main body apparatus 2 and stored in the memory 324. The control section 321 executes the various programs Pb stored in the memory 324.

Further, in a data storage area of the memory 324, various data used in processes such as a communication process and information processing to be executed by the spherical controller 200 is stored. In the exemplary embodiment, in the memory 324, operation data Dw, inertia data Dx, common reproduction data Dy, catch target reproduction data Dz, and the like are stored.

The operation data Dw is operation data to be appropriately transmitted to the main body apparatus 2. For example, the operation data Dw includes information regarding inputs from the joystick 21, the button sensing section 258, and the sensing circuit 322. In the exemplary embodiment, operation data is transmitted in a predetermined cycle from the spherical controller 200 through wireless communication.

The inertia data Dx is data indicating accelerations and/or angular velocities detected by the spherical controller 200. For example, the inertia data Dx includes data of detected accelerations generated in the xyz axis directions, data of detected angular velocities about the xyz axes, and/or the like and is transmitted in a predetermined cycle from the spherical controller 200 through wireless communication.

The common reproduction data Dy is sound data indicating a sound to be commonly output and light emission color data indicating a light emission color to be commonly output. For example, in the common reproduction data Dy, a sound and a light emission color to be output corresponding to a reproduction instruction from the main body apparatus 2 (e.g., the reproduction instruction data ID1 to ID9) are specified. It should be noted that the timing when the common reproduction data Dy is written to the memory 324 may be the time when the spherical controller 200 is manufactured, the time when an application in the spherical controller 200 is updated, the time when a game application is installed on the main body apparatus 2, or the like.

The catch target reproduction data Dz is sound data indicating a sound to be output corresponding to the catch target (the catch target character HC) and light emission color data indicating a light emission color to be output corresponding to the catch target. For example, in the catch target reproduction data Dz, a sound and a light emission color to be output corresponding to a reproduction instruction from the main body apparatus 2 (e.g., the reproduction instruction data ID10) are specified. It should be noted that the timing when the catch target reproduction data Dz is written to the memory 324 is the time when the catch target reproduction data Dz is transmitted from the main body apparatus 2 in accordance with the fact that the catch target (the catch target character HC) is set, or the like.

Figure 20:
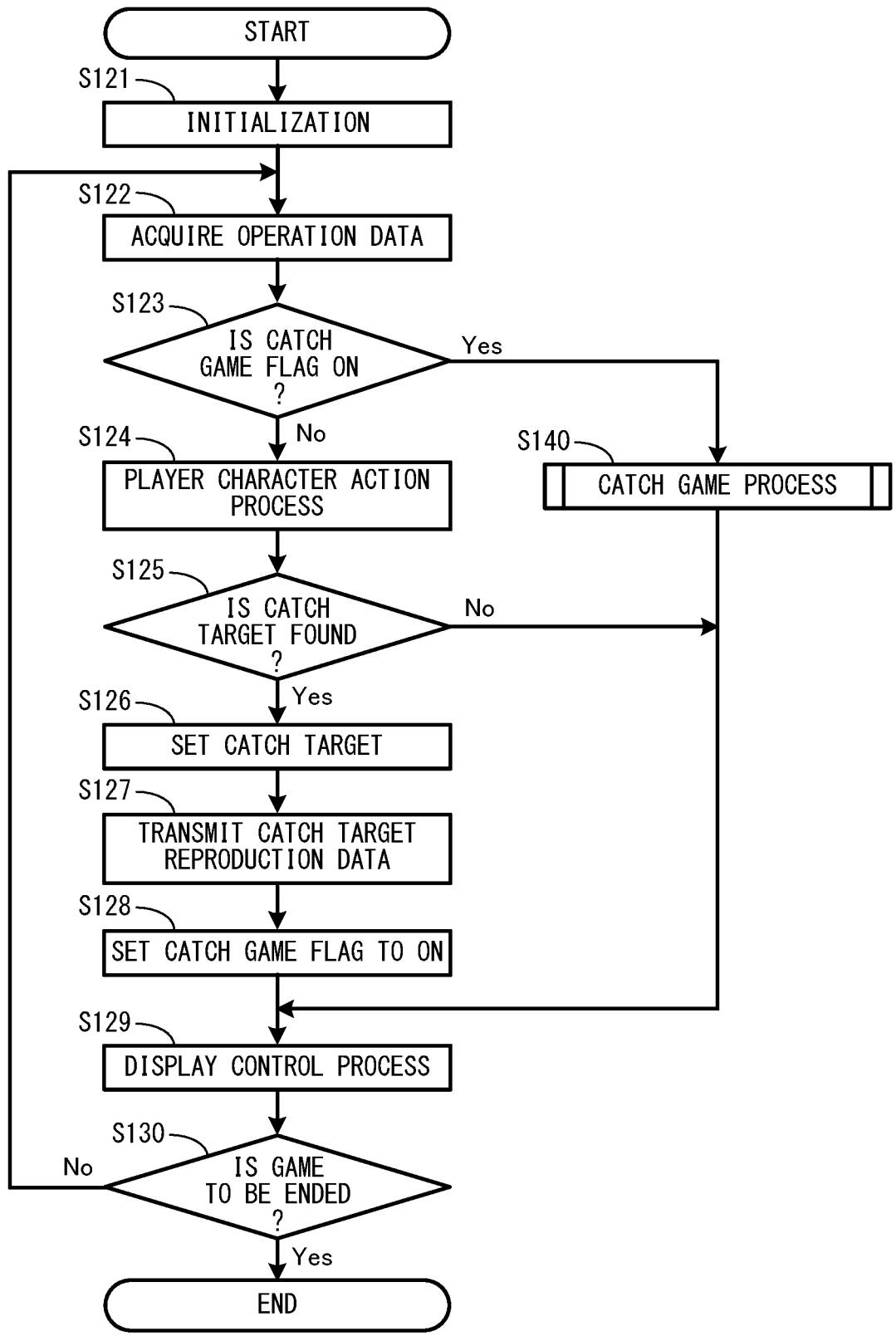
FIG. 20 is a flow chart showing a non-limiting example of game processing executed by the game system 1.
Figure 21:
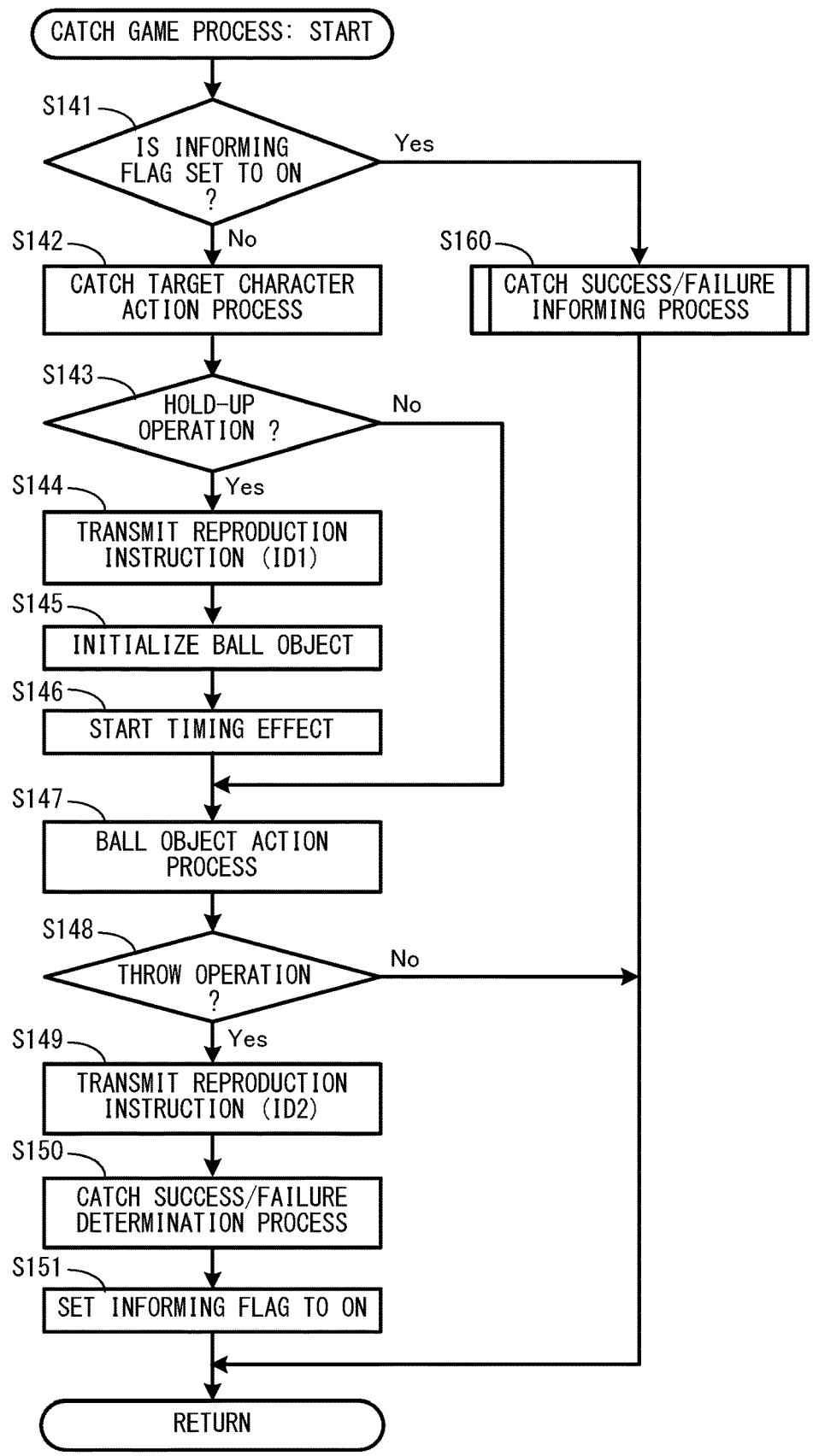
FIG. 21 is a subroutine showing a non-limiting detailed example of a catch game process performed in step S140 in FIG. 20.
Figure 22:
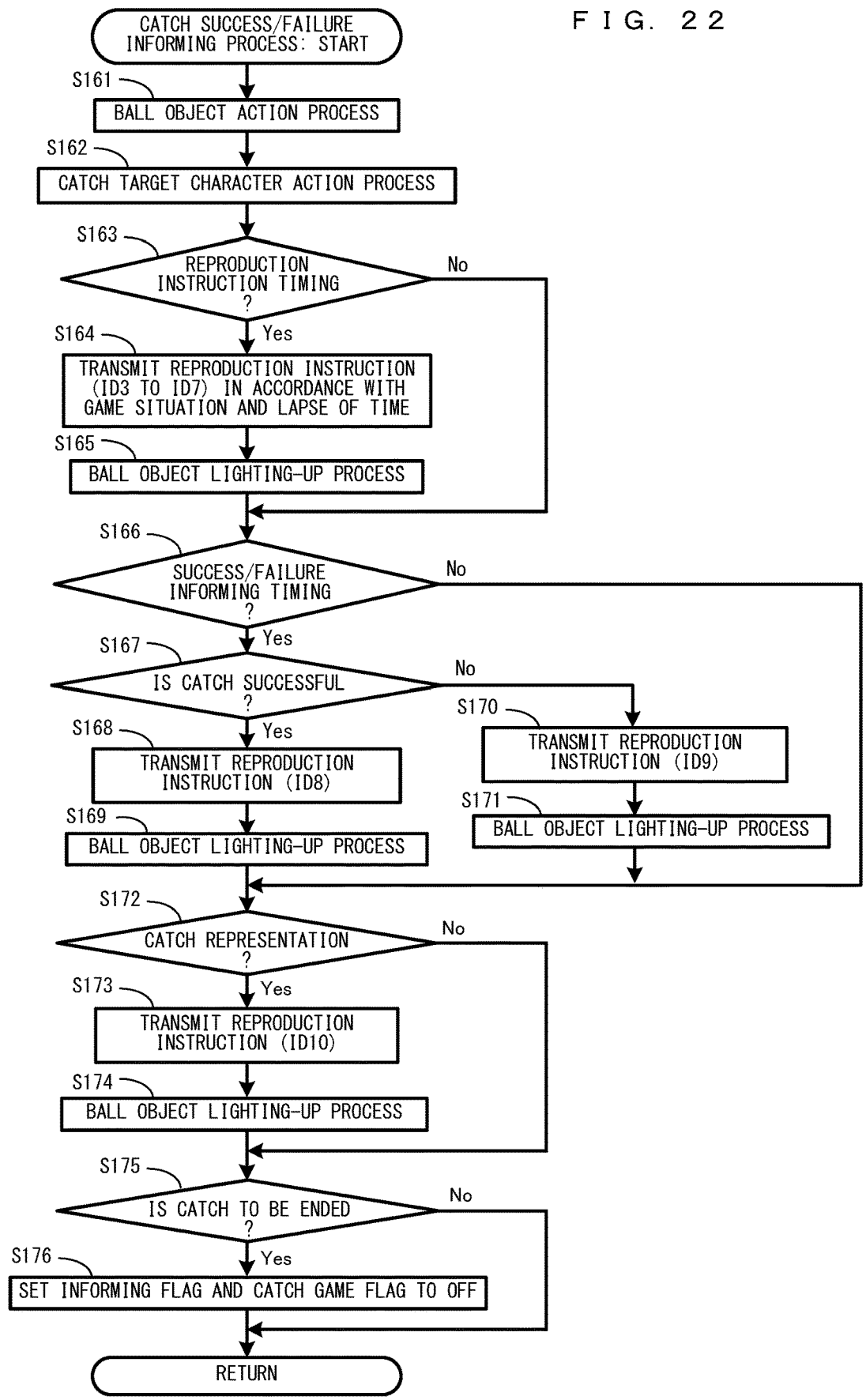
FIG. 22 is a subroutine showing a non-limiting detailed example of a catch success/failure notification process performed in step S160 in FIG. 21.

Next, with reference to FIGS. 20 to 22, a detailed example of information processing (game processing) according to the exemplary embodiment is described. FIG. 20 is a flow chart showing an example of game processing executed by the game system 1. FIG. 21 is a subroutine showing a detailed example of a catch game process performed in step S140 in FIG. 20. FIG. 22 is a subroutine showing a detailed example of a catch success/failure notification process performed in step S160 in FIG. 21. In the exemplary embodiment, a series of processes shown in FIGS. 20 to 22 is performed by the processor 81 executing a communication program or a predetermined application program (a game program) included in the various programs Pa. Further, the information processing shown in FIGS. 20 to 22 is started at any timing.

It should be noted that the processes of all of the steps in the flow charts shown in FIGS. 20 to 22 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 20 to 22 may be executed by the cooperation of a plurality of information processing apparatuses including the main body apparatus 2.

In FIG. 20, the processor 81 performs initialization in the game processing (step S121), and the processing proceeds to the next step. For example, in the initialization, the processor 81 initializes parameters for performing the processing described below. As an example, the processor 81 initializes each of the catch game flag indicated by the catch game flag data Df and the informing flag indicated by the informing flag data Dg to off. It should be noted that in the processing in this flow chart, the common reproduction data Dy is written to the memory 324 at the time when the spherical controller 200 is manufactured.

Next, the processor 81 acquires operation data from the spherical controller 200 and updates the operation data Da and the inertia data Db (step S122), and the processing proceeds to the next step.

Next, the processor 81 determines whether or not the catch game flag is set to on (step S123). For example, when the catch game flag indicated by the catch game flag data Df is set to on, the determination is affirmative in the above step S123. Then, when the catch game flag is set to off, the processing proceeds to step S124. On the other hand, when the catch game flag is set to on, the processing proceeds to step S140.

In step S124, the processor 81 performs a player character action process (step S124), and the processing proceeds to the next step. For example, in accordance with an instruction content indicated by the operation data Da updated in the above step S122, the processor 81 causes the player character PC to perform an action in the virtual space. Then, the processor 81 sets the position, the direction, the orientation, the action, and the like of the player character PC in the virtual space, thereby updating the player character action data Dj.

Next, the processor 81 determines whether or not the player character PC finds a single catch target (the catch target character HC) from among a plurality of characters placed in the virtual space (step S125). For example, when the player character PC comes into contact with one of the plurality of characters placed in the virtual space, or when one of the plurality of characters placed in the virtual space is placed in the field of view of the player character PC, the processor 81 determines that the character is found as a catch target. Then, when the catch target is found, the processing proceeds to step S126. On the other hand, when the catch target is not found, the processing proceeds to step S129.

In step S126, the processor 81 sets the catch target, and the processing proceeds to the next step. For example, the processor 81 sets the character found in the above step S125 as the catch target (the catch target character HC) and updates the catch target data Dc using the catch target.

Further, the processor 81 updates the catch target reproduction data Dd using data indicating a sound and a light emission color corresponding to the catch target character HC set as the catch target.

Next, the processor 81 transmits catch target reproduction data to the spherical controller 200 (step S127), and the processing proceeds to the next step. For example, the processor 81 transmits the catch target reproduction data Dd set in the above step S126 (the sound data Dd1 and the light emission color data Dd2 of the catch target character HC) to the spherical controller 200. Then, receiving the catch target reproduction data, the control section 321 of the spherical controller 200 updates the catch target reproduction data Dz in the memory 324 using the received data.

Next, the processor 81 sets the catch game flag to on (step S128), and the processing proceeds to step S129. For example, the processor 81 updates the catch game flag indicated by the catch game flag data Df to on.

On the other hand, when it is determined in the above step S123 that the catch game flag is set to on, the processor 81 performs a catch game process (step S140), and the processing proceeds to step S129. With reference to FIG. 21, the catch game process performed in the above step S140 is described below.

In FIG. 21, the processor 81 determines whether or not the informing flag is set to on (step S141). For example, when the informing flag indicated by the informing flag data Di is set to on, the determination of the processor 81 is affirmative in the above step S141. Then, when the informing flag is set to on, the processing proceeds to step S142. On the other hand, when the informing flag is set to off, the processing proceeds to step S160.

In step S142, the processor 81 performs a catch target character action process, and the processing proceeds to the next step. For example, based on a predetermined algorithm, the processor 81 causes the catch target character HC to perform an action in the virtual space. Then, the processor 81 sets the position, the direction, the orientation, the action, and the like of the catch target character HC in the virtual space, thereby updating the catch target character action data Di.

Next, the processor 81 determines whether or not a hold-up operation is performed (step S143). For example, when the operation data Da updated in the above step S122 indicates that the hold-up operation (e.g., the operation of pushing in the joystick 212 of the spherical controller 200) is performed, the determination is affirmative in the above step S143. Then, when the hold-up operation is performed, the processing proceeds to step S144. On the other hand, when the hold-up operation is not performed, the processing proceeds to step S147.

In step S144, the processor 81 transmits to the spherical controller 200 (see FIG. 17) the reproduction instruction data ID1 for causing the spherical controller 200 to output the sound of holding up the ball, and the processing proceeds to the next step. Then, in accordance with the reception of the reproduction instruction data ID1, the control section 321 of the spherical controller 200 extracts sound data corresponding to the reproduction instruction data ID1 from the common reproduction data Dy and causes the vibration section 271 to output a sound corresponding to the sound data (the sound of holding up the ball).

Next, the processor 81 initializes the ball object B (step S145), and the processing proceeds to the next step. For example, the processor 81 sets the ball object B in the virtual space to a position and an orientation determined in advance, thereby updating the ball object action data Dh.

Next, the processor 81 starts a timing effect (step S146), and the processing proceeds to step S147. For example, the processor 81 starts a timing effect representation that the display form of the catch timing image TM (see FIG. 13) sequentially changes (e.g., a representation that the size of a ring of the catch timing image TM sequentially changes), thereby sequentially updating the timing effect action data Dk.

In step S147, the processor 81 performs a ball object action process, and the processing proceeds to the next step. For example, the processor 81 calculates the orientation or the position of the ball object B so that the ball object B moves in the virtual space similarly to the orientation or the action of the spherical controller 200 in real space calculated by the inertia data Db updated in the above step S122, thereby updating the ball object action data Dh. For example, based on accelerations and/or angular velocities generated in the spherical controller 200 indicated by the inertia data Db, the processor 81 can calculate a change in the orientation of and a change in the position of the spherical controller 200 from the initial position and the initial orientation in real space (the position and the orientation of the spherical controller 200 at the time when the hold-up operation is performed). Then, the processor 81 changes the initial position and the initial orientation of the ball object B in the virtual space based on the change in the orientation of and the change in the position of the spherical controller 200, and thereby can move the ball object B in the virtual space similarly to the motion of the spherical controller 200 in real space. It should be noted that the ball object action process in the above step S147 may be performed only when the process of initializing the ball object B in the above step S145 is performed. In this case, after the hold-up operation is performed using the spherical controller 200, the ball object action process in the above step S147 is performed. Further, in the exemplary embodiment, as another example of the first data to be transmitted from a game controller, operation data (inertia data) corresponding to the orientation or the action of the spherical controller 200 is used.

Next, the processor 81 determines whether or not a throw operation is performed (step S148). For example, when the inertia data Db updated in the above step S122 indicates that the throw operation (e.g., the operation of swinging the spherical controller 200 by a motion with a predetermined acceleration or more) is performed, the determination is affirmative in the above step S148. Then, when the throw operation is performed, the processing proceeds to step S149. On the other hand, when the throw operation is not performed, the processing of the subroutine ends.

In step S149, the processor 81 transmits to the spherical controller 200 (see FIG. 17) the reproduction instruction data ID2 for causing the spherical controller 200 to output the sound of the ball flying off, and the processing proceeds to the next step. Then, in accordance with the reception of the reproduction instruction data ID2, the control section 321 of the spherical controller 200 extracts sound data corresponding to the reproduction instruction data ID2 from the common reproduction data Dy and causes the vibration section 271 to output a sound corresponding to the sound data (the sound of the ball flying off).

Next, the processor 81 performs a catch success/failure determination process (step S150), and the processing proceeds to the next step. For example, based on at least one of the timing when the throw operation is performed (e.g., the size of the catch timing image TM at the time when the throw operation is performed), the content of the throw operation (e.g., the magnitudes of accelerations generated in the spherical controller 200), the level of difficulty of the catch of the catch target character HC, the empirical value of the player character PC, the number of catch tries, and the like, the processor 81 determines the success or failure of the catch of the catch target character HC.

Next, the processor 81 sets the informing flag to on (step S151), and the processing of the subroutine ends. For example, the processor 81 updates the informing flag indicated by the informing flag data Dg to on.

On the other hand, when it is determined in the above step S141 that the informing flag is set to on, the processor 81 performs a catch success/failure informing process (step S160), and the processing of the subroutine ends. With reference to FIG. 22, a description is given below of the catch success/failure informing process performed in the above step S160.

In FIG. 22, the processor 81 performs a ball object action process (step S161), and the processing proceeds to the next step. For example, the processor 81 calculates the orientation or the position of the ball object B so that the ball object B moves along a trajectory in the virtual space in which from the position of the ball object B at the time when the throw operation is performed, the ball object B reaches the position where the catch target character HC is placed, thereby updating the ball object action data Dh. As another example, the ball object B may move along a trajectory in which the ball object B does not reach the position where the catch target character HC is placed. As an example, in accordance with the strength of the operation of throwing the spherical controller 200 (e.g., the relative magnitudes of accelerations generated in the spherical controller 200 in the throw operation), the ball object B stops moving on the near side of the catch target character HC, or the ball object B moves along a trajectory in which the ball object B flies off beyond the catch target character HC.

Next, the processor 81 performs a catch target character action process (step S162), and the processing proceeds to the next step. For example, based on a predetermined algorithm, the processor 81 causes the catch target character HC to perform an action in the virtual space. Then, the processor 81 sets the position, the direction, the orientation, the action, and the like of the catch target character HC in the virtual space, thereby updating the catch target character action data Di. It should be noted that in the catch target character action process in the above step S162, when the catch of the catch target character HC is failed, the catch target character HC may be caused to perform the action of escaping from the ball object B.

Next, in a representation performed during the period until the user is notified of the success or failure of the catch of the catch target character HC, the processor 81 determines whether or not the current timing is the timing when reproduction instruction data is transmitted to the spherical controller 200 (step S163). For example, as described with reference to FIG. 17, when the current moment is the timing when any of the reproduction instruction data ID3 to ID7 is transmitted, the determination is affirmative in the above step S163. Then, when the current timing is the timing when reproduction instruction data is transmitted to the spherical controller 200, the processing proceeds to step S164. On the other hand, when the current timing is not the timing when reproduction instruction data is transmitted to the spherical controller 200, the processing proceeds to step S166.

In step S164, in accordance with the game situation and the lapse of time, the processor 81 transmits any of the reproduction instruction data ID3 to ID7 to the spherical controller 200, and the processing proceeds to the next step. For example, as described with reference to FIG. 17, when the current moment is the timing when any of the reproduction instruction data ID3 to ID7 is transmitted, the processor 81 transmits any of the reproduction instruction data ID3 to ID7 as a target to the spherical controller 200. Then, in accordance with the reception of any of the reproduction instruction data ID3 to ID7, the control section 321 of the spherical controller 200 extracts sound data corresponding to any of the reproduction instruction data ID3 to ID7 from the common reproduction data Dy and causes the vibration section 271 to output a sound corresponding to the sound data. Further, in accordance with the reception of any of the reproduction instruction data ID3 to ID7, the control section 321 of the spherical controller 200 extracts light emission color data corresponding to any of the reproduction instruction data ID3 to ID7 from the common reproduction data Dy and causes the light-emitting section 248 to emit light in a color corresponding to the light emission color data.

Next, the processor 81 performs the process of lighting up the ball object B (step S165), and the processing proceeds to step S166. For example, when reproduction instruction data for causing the light-emitting section 248 of the spherical controller 200 to emit light is transmitted in the above step S164, the processor 81 sets the light-emitting part C as a part of the ball object B to the state where the light-emitting part C lights up or blinks in a light emission color indicated by the reproduction instruction data, thereby updating the ball object action data Dh.

In step S166, the processor 81 determines whether or not the current timing is the timing when the user is notified of the success or failure of the catch of the catch target character HC. For example, as described with reference to FIG. 17, when the current moment is the timing when the user is notified of the success or failure of the catch of the catch target character HC, i.e., the timing when the reproduction instruction data ID8 or the reproduction instruction data ID9 is transmitted, the determination is affirmative in the above step S166. Then, when the current timing is the timing when the user is notified of the success or failure of the catch of the catch target character HC, the processing proceeds to step S167. On the other hand, when the current timing is not the timing when the user is notified of the success or failure of the catch of the catch target character HC, the processing proceeds to step S172.

In step S167, the processor 81 determines whether or not the catch of the catch target character HC is successful. For example, when it is determined that the catch of the catch target character HC is successful in the catch success/failure determination process in the above step S150, the determination is affirmative in the above step S167. Then, when the catch of the catch target character HC is successful, the processing proceeds to step S168. On the other hand, when it is determined that the catch of the catch target character HC is failed in the catch success/failure determination process in the above step S150, the processing proceeds to step S170.

In step S168, the processor 81 causes the spherical controller 200 to output a sound indicating that the catch is successful, and transmits to the spherical controller 200 the reproduction instruction data ID8 for causing the spherical controller 200 to emit light in a color indicating that the catch is successful, and the processing proceeds to the next step. Then, in accordance with the reception of the reproduction instruction data ID8, the control section 321 of the spherical controller 200 extracts sound data corresponding to the reproduction instruction data ID8 from the common reproduction data Dy and causes the vibration section 271 to output a sound corresponding to the sound data (a catch success sound). Further, in accordance with the reception of the reproduction instruction data ID8, the control section 321 of the spherical controller 200 extracts light emission color data corresponding to the reproduction instruction data ID8 from the common reproduction data Dy and causes the light-emitting section 248 to emit light in a color corresponding to the light emission color data (e.g., green).

Next, the processor 81 performs the process of lighting up the ball object B (step S169), and the processing proceeds to step S172. For example, the processor 81 sets the light-emitting part C as a part of the ball object B to the state where the light-emitting part C lights up or blinks in a color indicating that the catch is successful (e.g., green), thereby updating the ball object action data Dh.

On the other hand, in step S170, the processor 81 causes the spherical controller 200 to output a sound indicating that the catch is failed, and transmits to the spherical controller 200 the reproduction instruction data ID9 for causing the spherical controller 200 to emit light in a color indicating that the catch is failed, and the processing proceeds to the next step. Then, in accordance with the reception of the reproduction instruction data ID9, the control section 321 of the spherical controller 200 extracts sound data corresponding to the reproduction instruction data ID9 from the common reproduction data Dy and causes the vibration section 271 to output a sound corresponding to the sound data (a catch failure sound). Further, in accordance with the reception of the reproduction instruction data ID9, the control section 321 of the spherical controller 200 extracts light emission color data corresponding to the reproduction instruction data ID9 from the common reproduction data Dy and causes the light-emitting section 248 to emit light in a color corresponding to the light emission color data (e.g., red).

Next, the processor 81 performs the process of lighting up the ball object B (step S171), and the processing proceeds to step S172. For example, the processor 81 sets the light-emitting part C as a part of the ball object B to the state where the light-emitting part C lights up or blinks in a color indicating that the catch is failed (e.g., red), thereby updating the ball object action data Dh.

It should be noted that the process of lighting up the ball object B in the above step S171 is performed when the catch of the catch target character HC is failed. As another exemplary embodiment, a representation different from the representation that the ball object B lights up may be performed. As an example, in the above step S171, the processor 81 may not cause the light-emitting part C of the ball object B to light up or blink, but may perform a representation that the ball object B cracks open, and the catch target character HC escapes from within the ball object B, thereby updating the ball object action data Dh. In this case, the action of the catch target character HC escaping from within the ball object B may be set in the catch target character action process in the above step S162, the catch target character HC may continue to be set as the catch target again, and the catch game may be repeated a predetermined number of times.

In step S172, the processor 81 determines whether or not the current timing is the timing when a catch representation for representing the state where the catch target character HC is caught in the ball object B (the spherical controller 200) is performed. For example, as described with reference to FIG. 17, when the current moment is the timing when the state where the catch target character HC is caught in the ball object B (the spherical controller 200) is represented, i.e., the timing when the reproduction instruction data ID10 is transmitted, the determination is affirmative in the above step S172. Then, when the current timing is the timing when the catch representation for indicating that the catch target character HC is caught is performed, the processing proceeds to step S173. On the other hand, when the current timing is not the timing when the catch representation for indicating that the catch target character HC is caught is performed, the processing proceeds to step S175.

In step S173, the processor 81 causes the spherical controller 200 to output the cry of the catch target character HC of which the catch is successful, and transmits to the spherical controller 200 the reproduction instruction data ID10 for causing the spherical controller 200 to emit light in the base color of the catch target character HC of which the catch is successful, and the processing proceeds to the next step. Then, in accordance with the reception of the reproduction instruction data ID10, the control section 321 of the spherical controller 200 extracts sound data corresponding to the reproduction instruction data ID10 from the catch target reproduction data Dz and causes the vibration section 271 to output a sound corresponding to the sound data (the cry of the catch target character HC). Further, in accordance with the reception of the reproduction instruction data ID10, the control section 321 of the spherical controller 200 extracts light emission color data corresponding to the reproduction instruction data ID10 from the catch target reproduction data Dz and causes the light-emitting section 248 to emit light in a color corresponding to the light emission color data (e.g., the base color of the catch target character HC).

Next, processor 81 performs the process of lighting up the ball object B (step S174), and the processing proceeds to step S175. For example, the processor 81 sets the light-emitting part C as a part of the ball object B to the state where the light-emitting part C lights up or blinks in a color corresponding to the catch target character HC of which the catch is successful (e.g., the base color), thereby updating the ball object action data Dh.

In step S175, the processor 81 determines whether or not the catch game is to be ended. For example, when the period when the state where the catch target character HC is caught in the ball object B (the spherical controller 200) is represented ends, or when the representation indicating that the catch of the catch target character HC is failed ends, the determination is affirmative in the above step S175. Then, when the catch game is to be ended, the processing proceeds to step S176. On the other hand, when the catch game is to be continued, the processing of the subroutine ends.

In step S176, the processor 81 sets each of the informing flag and the catch game flag to off, and the processing of the subroutine ends. For example, the processor 81 updates the informing flag indicated by the informing flag data Dg to off and updates the catch game flag indicated by the catch game flag data Df to off.

Referring back to FIG. 20, in step S129, the processor 81 performs a display control process, and the processing proceeds to the next step. For example, using the ball object action data Dh, the catch target character action data Di, and the player character action data Dj, the processor 81 places the ball object B, the catch target character HC, the player character PC, and the like in the virtual game space. Then, the processor 81 performs the process of generating a virtual space image obtained by viewing the virtual space from a virtual camera placed at a predetermined position, and of displaying the virtual space image on a display screen of a display device (e.g., the stationary monitor 6). Further, using the timing effect action data Dk, the processor 81 performs the process of combining the catch timing image TM with the virtual space image such that the catch timing image TM is included in the virtual space image, and displaying the virtual space image on the display screen of the display device.

Next, the processor 81 determines whether or not the game is to be ended (step S130). Examples of a condition for ending the game in the above step S130 include the fact that the result of the game is finalized, the fact that a user performs the operation of ending the game, and the like. When the game is not to be ended, the processing returns to the above step S122, and the process of step S122 is repeated. When the main game is to be ended, the processing of the flow chart ends. Hereinafter, the series of processes of steps S122 to S130 is repeatedly executed until it is determined in step S130 that the game is to be ended.

As described above, in the exemplary embodiment, by operating the spherical controller 200, the spherical controller 200 outputs a sound corresponding to the catch target character HC of which the catch is successful (e.g., the cry). Thus, it is possible to increase a realistic feeling in a game where the catch target character HC is caught. Further, in the exemplary embodiment, by operating the spherical controller 200, the spherical controller 200 emits light in the base color of the catch target character HC of which the catch is successful. Thus, it is possible to further increase a realistic feeling in the game where the catch target character HC is caught.

It should be noted that in the above description, an example has been used where immediately after the catch of the catch target character HC is successful, the spherical controller 200 outputs a sound corresponding to the catch target character HC of which the catch is successful (e.g., the cry), and the spherical controller 200 emits light in the base color of the catch target character HC. Consequently, it is possible to give the user a feeling as if the catch target character HC of which the catch is successful is in the spherical controller 200. Such a representation, however, may be performed outside the period immediately after the catch is successful. As a first example, catch target reproduction data stored in the spherical controller 200 when the catch target is set is maintained also after the catch game, whereby using as a trigger the fact that a predetermined operation (e.g., the operation of swinging the spherical controller 200, a tilt operation on the joystick 21, a pressing operation on the operation surface 213, or the like) is performed on the spherical controller 200 at any timing during the above game, the spherical controller 200 may output a sound corresponding to the catch target character HC, and the spherical controller 200 may emit light in the base color of the catch target character HC. As a second example, even in the state where the main body apparatus 2 and the spherical controller 200 do not wirelessly communicate with each other, i.e., the state where the above game is not performed, then using as a trigger the fact that a predetermined operation is performed on the spherical controller 200, the spherical controller 200 may output a sound corresponding to the catch target character HC, and the spherical controller 200 may emit light in the base color of the catch target character HC. In the second example, catch target reproduction data used in the representation is transmitted from the main body apparatus 2 and stored in the spherical controller 200. Alternatively, catch target reproduction data stored when the catch target is set in the catch game may be maintained until the representation is performed, and may be used. Yet alternatively, catch target reproduction data stored in the spherical controller 200 by performing the process of transferring the catch target reproduction data from the main body apparatus 2 to the spherical controller 200 during the period when the above catch game is not performed may be used in the representation. In the second example, even in the state where the main body apparatus 2 and the spherical controller 200 do not wireless communicate with each other, the representation can be performed. Thus, it is possible to give the user a feeling as if carrying out the spherical controller 200 in the state where the catch target character HC is stored in the spherical controller 200.

Further, in the above exemplary embodiment, an example has been used where the spherical controller 200 outputs a sound corresponding to the catch target character HC (e.g., the cry). A vibration corresponding to the catch target character HC may be imparted to the spherical controller 200. In this case, catch target reproduction data stored in the spherical controller 200 may not include a sound signal having a frequency in the audible range for causing the vibration section 271 to output a desired sound, and may include only a vibration signal having a frequency outside the audible range for causing the vibration section 271 to perform a vibration in a waveform corresponding to the catch target character HC.

Further, in the above description, an exemplary game in a case where a single user operates the spherical controller 200 has been used. Alternatively, in the exemplary embodiment, multiplayer play is also possible in which a plurality of users play a catch game by operating the spherical controller 200 and/or another controller (e.g., the left controller 3 or the right controller 4). In this case, it is possible that the users operate different player characters PC, whereby player characters PC throw different ball objects B to a single catch target character HC. When a catch game based on such multiplayer play is performed, then in accordance with the fact that a single catch target character HC as a catch target is selected and set, the type of catch target reproduction data corresponding to the catch target character HC is transmitted from the main body apparatus 2 to a plurality of controllers (e.g., a plurality of spherical controllers 200) and stored in the plurality of controllers. Then, as an example, when any of the users succeeds in catching the catch target character HC, all the plurality of controllers 200 output a sound corresponding to the catch target character HC of which the catch is successful, and all the plurality of controllers 200 emit light in the base color of the catch target character HC. Further, as another example, when any of the users succeeds in catching the catch target character HC, only the controller of the user outputs a sound corresponding to the catch target character HC of which the catch is successful, and only the controller emits light in the base color of the catch target character HC.

Further, in the above description, an example has been used where the operation determination process and the process of outputting a sound, a vibration, and light from the spherical controller 200 are performed by the main body apparatus 2. Alternatively, at least a part of these processes may be performed by the spherical controller 200. For example, the process of calculating the accelerations, the angular velocities, and the orientation of the spherical controller 200, the process of calculating the axial directions of the spherical controller 200 and the amounts of change in the axial directions, the process of calculating an acceleration generated in the spherical controller 200 (a gravitational acceleration), and the like may be performed in the spherical controller 200. Further, the process of causing the vibration section 271 to output a sound and/or a vibration and the process of causing the light-emitting section 248 to emit light may be performed in the spherical controller 200. As an example, using as a trigger the fact that the main body apparatus 2 or the spherical controller 200 determines that the operation of throwing the spherical controller 200 is performed, the control section 321 in the spherical controller 200 may control the operation of the vibration section 271, whereby the process of controlling a sound and/or a vibration to be output from the vibration section 271 may be performed in the spherical controller 200. As another example, in accordance with the arrival of a predetermined timing, the control section 321 in the spherical controller 200 may control the vibration section 271 to output a predetermined sound and/or a predetermined vibration.

Further, in the above exemplary embodiment, a method for detecting the motion or the orientation of the spherical controller 200 is a mere example. Alternatively, the motion or the orientation of the spherical controller 200 may be detected using another method or another piece of data. Further, in the above exemplary embodiment, a game image corresponding to an operation using the spherical controller 200 is displayed on the stationary monitor 6, but may be displayed on the display 12 of the main body apparatus 2. Further, the controller for controlling the action of the player character PC may be not only the spherical controller 200, but also another controller.

Further, in the above exemplary embodiment, the spherical controller 200 includes as a direction input section a joystick including a shaft portion that allows a tilt operation. Here, in another exemplary embodiment, the spherical controller 200 may include as a direction input section any input device that allows a direction input. As an example, a direction input section of the spherical controller 200 may be an input device including a slidable slide portion (specifically, a slide stick). Further, as another example, a direction input section of the spherical controller 200 may be a directional pad.

Further, in the above exemplary embodiment, a game controller (i.e., the spherical controller 200) of which the outer shape is spherical has been described as an example. Here, in another exemplary embodiment, the outer shape of the game controller may be any shape. For example, further, the spherical controller 200 may include a transmission section (i.e., the communication section 323) that transmits information (e.g., information regarding an operation on the joystick and information regarding an operation on the operation surface) to outside. Here, "transmit information to outside" includes a form in which information is transmitted to not only the main body apparatus 2 but also any other apparatus different from the spherical controller 200. That is, the spherical controller 200 may be able to communicate with an information processing apparatus of another type different from the main body apparatus 2. For example, the main body apparatus 2 may be composed of a smartphone or a tablet. Alternatively, the spherical controller 200 may be able to wirelessly communicate with a smartphone and/or a tablet. Yet alternatively, the spherical controller 200 may be able to wirelessly communicate with a mobile game apparatus of another type different from the main body apparatus 2. Further, the spherical controller 200 may communicate with another game controller (e.g., the above spherical controller 200). At this time, information from the spherical controller 200 may be transmitted to an information processing apparatus (e.g., the main body apparatus 2) via the other game controller.

Further, communication between the spherical controller 200 and another apparatus may be wireless communication or wired communication. Further, the spherical controller 200 may be used not only for game use but also for another use. For example, in a case where an information processing program (e.g., a browser) different from a game program is executed by the main body apparatus 2, the spherical controller 200 may be a controller (in other words, an operation device) used to perform an operation regarding the information processing program.

Further, in the above exemplary embodiment, the light-emitting section 248 is included in the spherical controller 200. As another exemplary embodiment, as a light-emitting section included in the spherical controller 200, in addition to (or instead of) the light-emitting section 248, a display screen (e.g., a liquid crystal screen or an organic EL screen) may be included in at least a part of the outer surface of the spherical controller 200. In this case, as another exemplary embodiment, the light emission of the spherical controller 200 corresponding to the caught catch target character HC may be a pattern using a plurality of colors displayed on the display screen. Further, as another exemplary embodiment, the light emission of the spherical controller 200 corresponding to the caught catch target character HC may be an image of at least a part of the catch target character HC displayed on the display screen.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the game system 1 may be any apparatus, and may be a mobile game apparatus, any mobile electronic device (a PDA (Personal Digital Assistant), a mobile phone, a smart device (a smartphone or the like), a personal computer, a camera, a tablet, or the like. If these pieces of hardware can execute a game application, any of these pieces of hardware can function as a game apparatus.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may move in conjunction with to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as a game system, a game processing method, a game program, a game apparatus, a game controller, and the like that are capable of increasing a realistic feeling in a game where a game controller is used.

What is claimed is:

1. A game system including a game controller having an inertial sensor and configured to transmit first data based on an output from the inertial sensor to outside, and a game apparatus configured to communicate with the game controller, the game apparatus comprising at least one processor configured to:
  receive the first data transmitted from the game controller;
  based on the first data, execute game processing for catching a predetermined game character;
  generate second data corresponding to the game character as a target to be caught in the game processing; and
  transmit the second data to the game controller, and
the game controller comprising:
  a receiver configured to receive the second data transmitted from the game apparatus;
  a sound outputter configured to output a sound; and
  a sound output controller configured to, based on the second data received by the receiver, cause the sound outputter to output a sound corresponding to the caught game character.

2. The game system according to claim 1, wherein
the game controller further comprises:
  a light emitter; and
  a light emission controller configured to, based on the second data, cause the light emitter to emit light in a color corresponding to the caught game character.

3. The game system according to claim 1, wherein
the execution of a game where the game character is caught is performed by determining success or failure of the catch of the game character.

4. The game system according to claim 3, wherein
the at least one processor of the game apparatus is further configured to, when it is determined that the catch of the game character is successful, further transmit, to the game controller, third data for outputting a sound corresponding to the game character,
the receiver of the game controller further receives the third data, and
in accordance with the fact that the receiver receives the third data, and based on the second data, the sound output controller causes the sound outputter to output a sound corresponding to the game character of which the catch is successful.

5. The game system according to claim 3, wherein
the game controller further comprises:
  a light emitter; and
  a light emission controller configured to, based on the second data, cause the light emitter to emit light in a color corresponding to the caught game character,
the at least one processor of the game apparatus is further configured to, when it is determined that the catch of the game character is successful, transmit, to the game controller, fourth data for causing the light emitter to emit light in a color corresponding to the game character,
the receiver of the game controller further receives the fourth data, and
in accordance with the fact that the receiver receives the fourth data, and based on the second data, the light emission controller causes the light emitter to emit light in a color corresponding to the game character of which the catch is successful.

6. The game system according to claim 3, wherein
the at least one processor of the game apparatus is further configured to transmit, to the game controller, data indicating a result of determining the success or failure of the catch of the game character, and
the light emission controller causes the light emitter to emit light in a color corresponding to the success or failure of the catch of the game character corresponding to the result of the determination.

7. The game system according to claim 3, wherein
the at least one processor of the game apparatus is further configured to, before the success or failure of the catch of the game character is determined, transmit the second data corresponding to the game character to the game controller.

8. The game system according to claim 7, wherein
the at least one processor of the game apparatus is further configured to, before the catch, identify the game character as the target to be caught, and
before the success or failure of the catch of the game character is determined, the at least one processor of the game apparatus transmits the second data corresponding to the identified game character to the game controller.

9. The game system according to claim 1, wherein
the game controller further comprises a vibrator, and
the game system further comprises a processor configured to, when a predetermined operation is performed on the game controller to catch the game character, vibrate the vibrator based on an output from the inertial sensor of the game controller.

10. The game system according to claim 1, wherein
the game controller further comprises a vibrator, and
the game system further comprises a processor configured to, before success or failure of the catch of the game character is finalized, intermittently vibrate the vibrator of the game controller.

11. The game system according to claim 1, wherein
in accordance with the fact that the game character is caught, and based on the second data, the sound output controller causes the sound outputter to output a sound corresponding to the caught game character, and based on the second data and an output from the inertial sensor, further causes the sound outputter to output a sound corresponding to the caught game character after the catch, or based on after-the-catch data corresponding to the caught game character and an output from the inertial sensor that are received from the game apparatus separately from the second data, further causes the sound outputter to output a sound corresponding to the caught game character after the catch.

12. The game system according to claim 1, wherein
the game controller further comprises a direction inputter,
the at least one processor of the game apparatus is further configured to, based on an operation on the direction inputter, execute a process of searching for the predetermined game character in a virtual world,
the at least one processor of the game apparatus executes game processing for catching the searched-for game character based on the first data, and
in accordance with the fact that the searched-for game character is caught, and based on the second data, the sound output controller causes the sound outputter to output a sound corresponding to the caught game character.

13. The game system according to claim 1, wherein
the at least one processor of the game apparatus is further configured to:
display on a display screen a virtual space where an object that resembles an external appearance of the game controller is placed; and
during the execution of the game processing, based on the first data received from the game controller, control a position and/or an orientation of the object in the virtual space, and
based on the first data received from the game controller, the position and/or the orientation of the object in the virtual space are controlled to correspond to a position and/or an orientation of the game controller in real space.

14. A game processing method for performing a process using a game controller having an inertial sensor and a sound outputter that outputs a sound and configured to transmit first data based on an output from the inertial sensor to outside, the game processing method comprising:
receiving the first data transmitted from the game controller;
based on the first data, executing game processing for catching a predetermined game character;
generating second data corresponding to the game character as a target to be caught in the game processing;
transmitting the second data to the game controller;
receiving the transmitted second data; and
based on the received second data, causing the sound outputter to output a sound corresponding to the caught game character.

15. A non-transitory computer-readable storage medium having stored therein a game program to be executed by a computer included in a game apparatus for performing a process using a game controller having an inertial sensor and a sound outputter that outputs a sound and configured to transmit first data based on an output from the inertial sensor to outside, the game program comprising:
receiving the first data transmitted from the game controller;
based on the first data, executing game processing for catching a predetermined game character;
generating second data corresponding to the game character as a target to be caught in the game processing; and
transmitting the second data to the game controller, thereby, based on the second data, causing the sound outputter to output a sound corresponding to the caught game character.

16. A game apparatus for performing a process using a game controller having an inertial sensor and a sound outputter that outputs a sound and configured to transmit first data based on an output from the inertial sensor to outside, the game apparatus comprising at least one processor configured to:
receive the first data transmitted from the game controller;
based on the first data, execute game processing for catching a predetermined game character;
generate second data corresponding to the game character as a target to be caught in the game processing; and
transmit the second data to the game controller, thereby, based on the second data, causing the sound outputter to output a sound corresponding to the caught game character.

17. A game controller capable of communicating with a game apparatus, the game controller comprising:
an inertial sensor;
a transmitter configured to transmit, to the game apparatus, first data based on an output from the inertial sensor;
a receiver configured to, in game processing for catching a predetermined game character, receive, from the game apparatus, second data corresponding to the game character as a target to be caught;

a sound outputter configured to output a sound; and a sound output controller configured to, when the game apparatus notifies a user based on the first data that the predetermined game character is caught, then based on the second data, cause the sound outputter to output a sound corresponding to the caught game character.

* * * * *